(12) United States Patent
Nurishi

(10) Patent No.: US 6,989,942 B1
(45) Date of Patent: Jan. 24, 2006

(54) ZOOM LENS AND PHOTOGRAPHING APPARATUS HAVING THE SAME

(75) Inventor: Ryuji Nurishi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 09/669,664

(22) Filed: Sep. 26, 2000

(30) Foreign Application Priority Data

Sep. 28, 1999 (JP) .......................................... 11-274596

(51) Int. Cl.
*G02B 15/163* (2006.01)
*G02B 27/64* (2006.01)
*G02B 15/10* (2006.01)

(52) U.S. Cl. ...................... 359/687; 359/557; 359/674; 359/688

(58) Field of Classification Search ......... 359/686–688, 359/554–557, 672–675
See application file for complete search history.

(56) References Cited

U.S. PATENT DOCUMENTS

| | | | | |
|---|---|---|---|---|
| 4,054,372 A | * | 10/1977 | Schroeder | 359/683 |
| 4,639,096 A | * | 1/1987 | Kitagishi et al. | 359/686 |
| 4,927,250 A | | 5/1990 | Suda | 350/500 |
| 5,039,211 A | | 8/1991 | Maruyama | 359/557 |
| 5,097,360 A | | 3/1992 | Fukami et al. | 359/674 |
| 5,270,857 A | | 12/1993 | Oizumi et al. | 359/554 |
| 5,477,297 A | | 12/1995 | Suzuki | 354/195.1 |
| 5,585,966 A | | 12/1996 | Suzuki | 359/557 |
| 5,627,677 A | * | 5/1997 | Suzuki | 359/557 |
| 5,694,253 A | * | 12/1997 | Shibayama | 359/684 |
| 5,721,641 A | | 2/1998 | Aoki | 359/557 |
| 5,748,384 A | * | 5/1998 | Sensui | 359/686 |
| 5,751,497 A | * | 5/1998 | Usui et al. | 359/683 |
| 5,758,206 A | | 5/1998 | Imaoka | 396/80 |
| 5,760,957 A | | 6/1998 | Suzuki | 359/557 |
| 5,781,348 A | | 7/1998 | Ohtake | 359/676 |
| 5,790,316 A | * | 8/1998 | Terasawa et al. | 359/687 |
| 5,966,246 A | * | 10/1999 | Yoshikawa | 359/686 |
| 6,025,962 A | | 2/2000 | Suzuki | 359/766 |
| 6,104,432 A | * | 8/2000 | Nakamura et al. | 348/360 |
| 6,225,614 B1 | * | 5/2001 | Ono | 250/201.5 |
| 6,384,975 B1 | * | 5/2002 | Hayakawa | 359/557 |
| 6,473,231 B2 | * | 10/2002 | Hamano et al. | 359/557 |
| 6,560,016 B2 | * | 5/2003 | Usui et al. | 359/557 |

FOREIGN PATENT DOCUMENTS

| | | |
|---|---|---|
| JP | 61-223819 | 10/1986 |
| JP | 1-116619 | 5/1989 |
| JP | 2-124521 | 5/1990 |
| JP | 5-232410 | 9/1993 |
| JP | 7-92431 | 4/1995 |
| JP | 7-152002 | 6/1995 |
| JP | 7-199124 | 8/1995 |
| JP | 09-329744 | 12/1997 |
| JP | 10-90601 | 4/1998 |
| JP | 11237551 A * | 8/1999 |
| JP | 11311742 A * | 11/1999 |

OTHER PUBLICATIONS

Patent Abstracts of Japan, vol. 1998, No. 9, Jul. 31, 1998 (JP–A 10–90601, Apr. 10, 1998).

\* cited by examiner

*Primary Examiner*—Scott J. Sugarman
*Assistant Examiner*—Deborah Raizen
(74) *Attorney, Agent, or Firm*—Fitzpatrick, Cella, Harper & Scinto

(57) ABSTRACT

A zoom lens includes, in order from an object side to an image side, a first lens unit of positive refractive power, a second lens unit of negative refractive power arranged to move during variation of magnification, a third lens unit arranged to compensate for shift of an image plane due to the variation of magnification, and a fourth lens unit of positive refractive power, wherein the fourth lens unit has a first lens subunit of negative refractive power, and an image is displaced by moving the first lens subunit in such a way as to have a component perpendicular to an optical axis of the zoom lens.

19 Claims, 16 Drawing Sheets

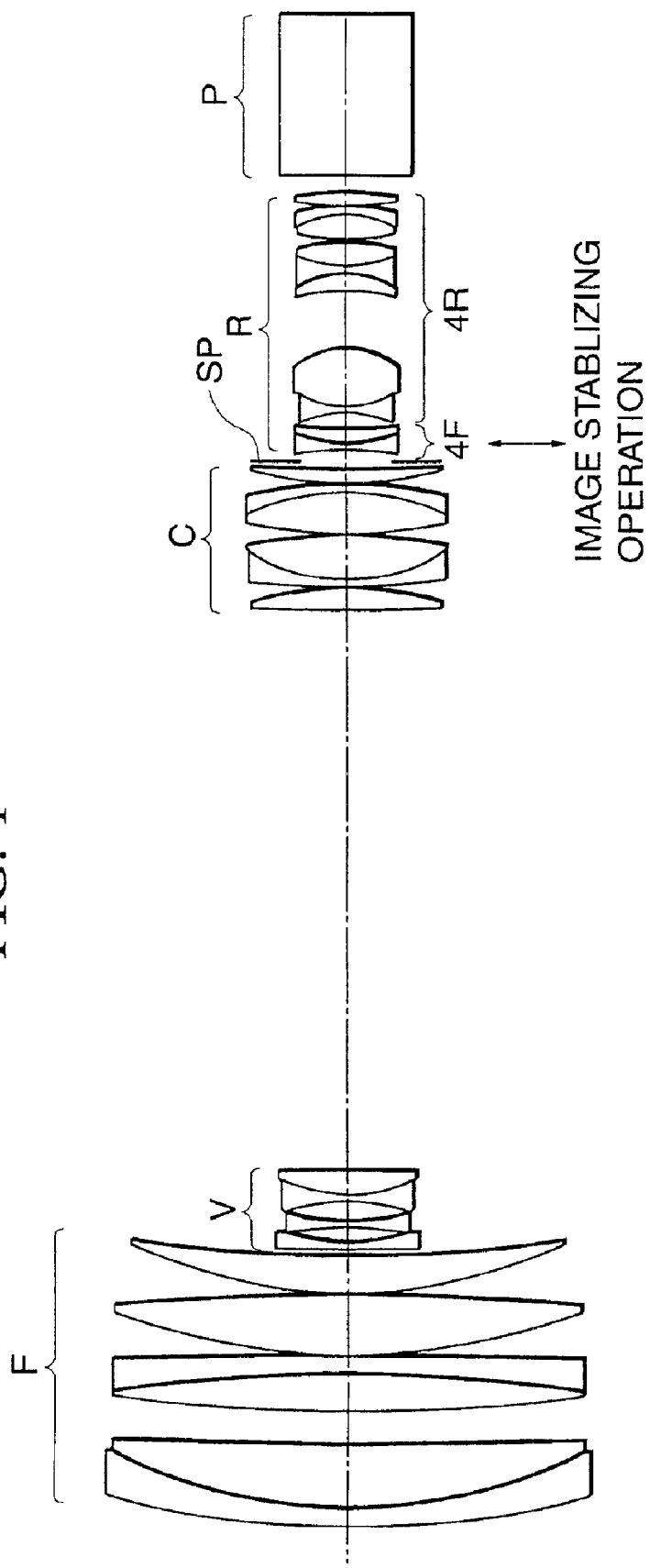

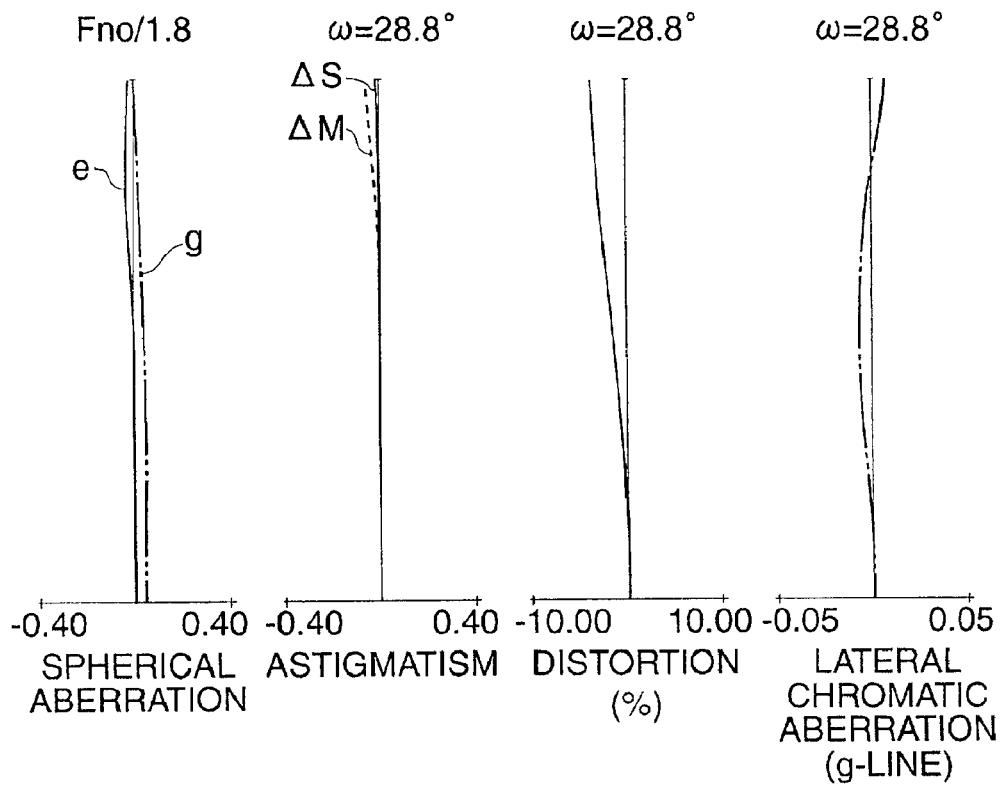
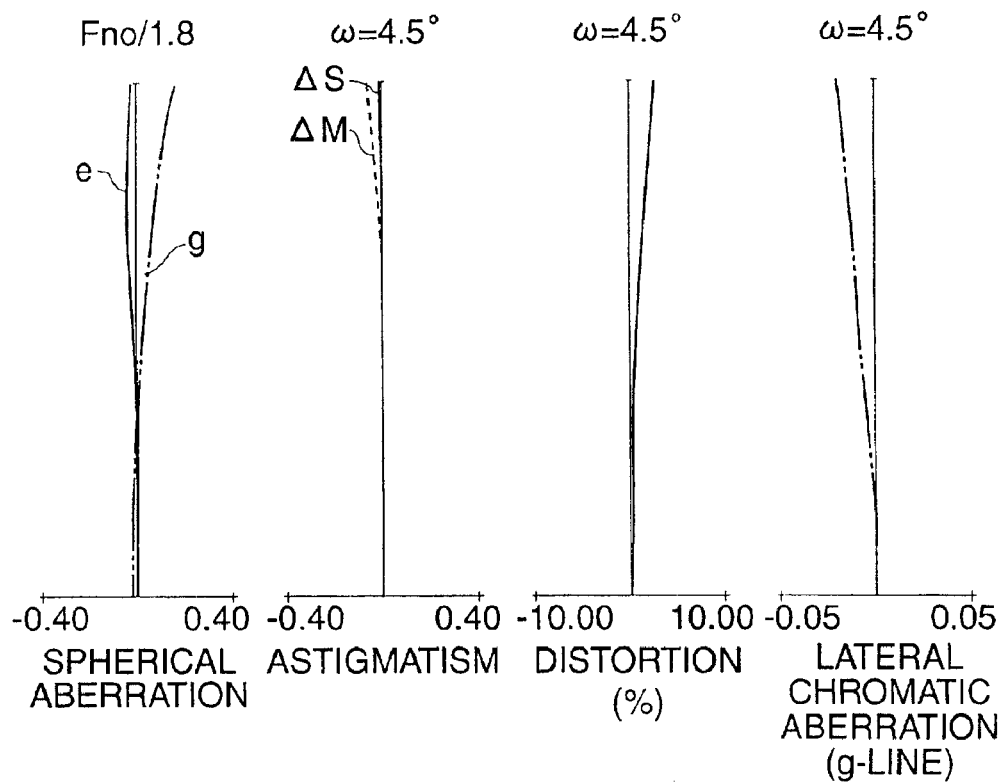

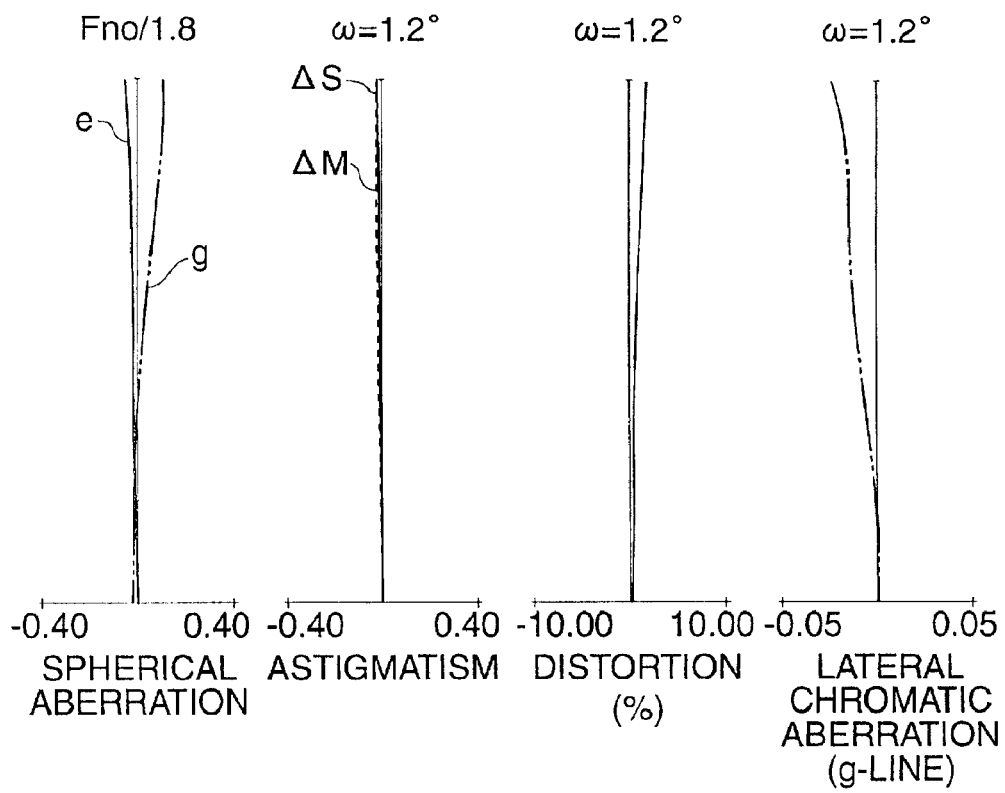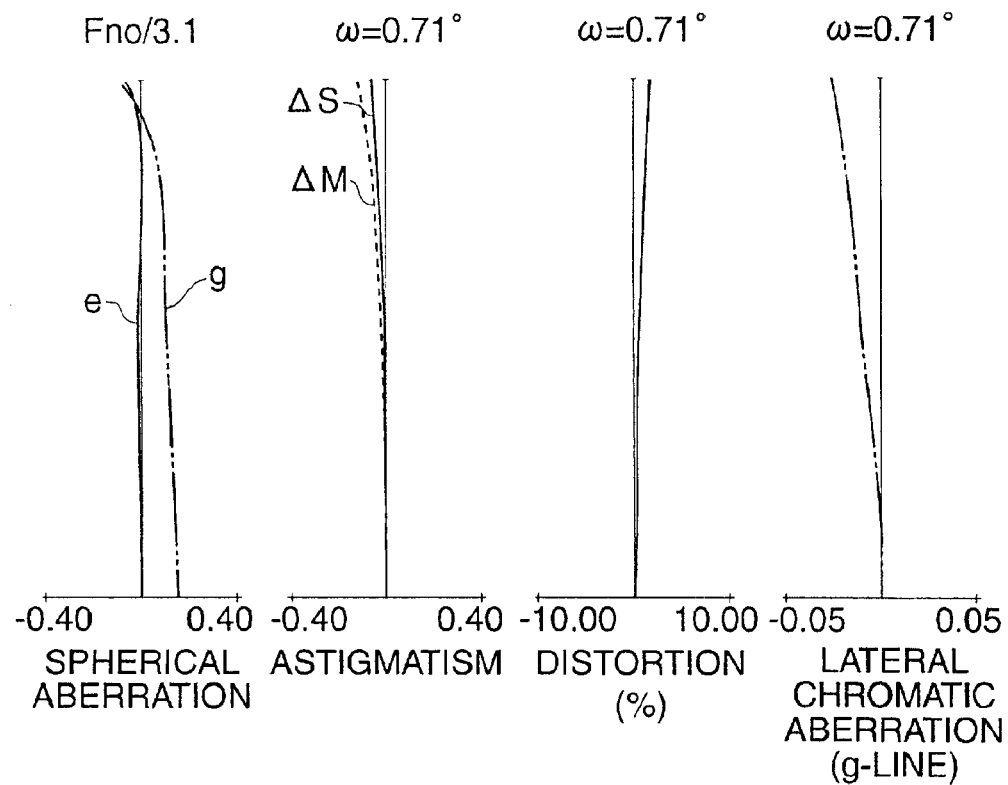

FIG. 12A
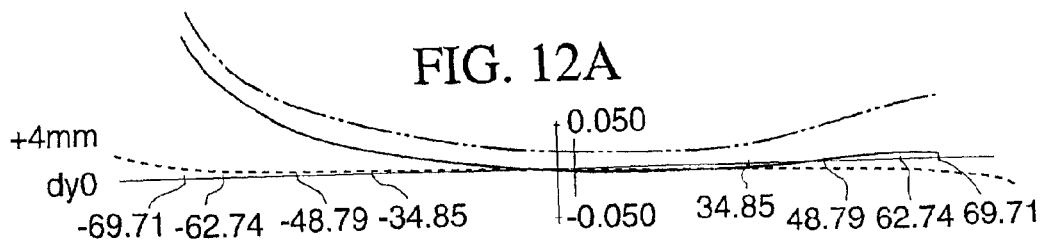
FIG. 12B
FIG. 12C
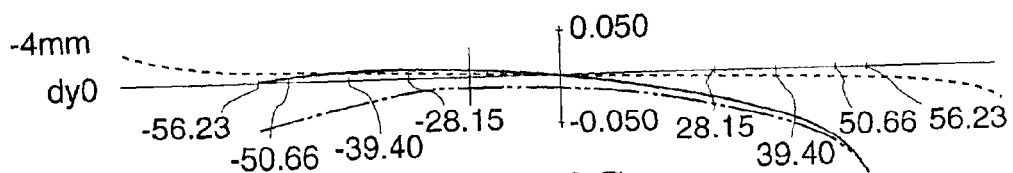
FIG. 13A
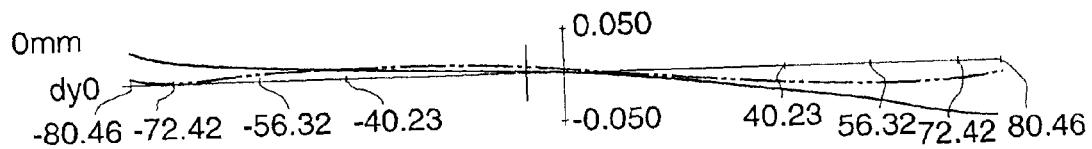
FIG. 13B
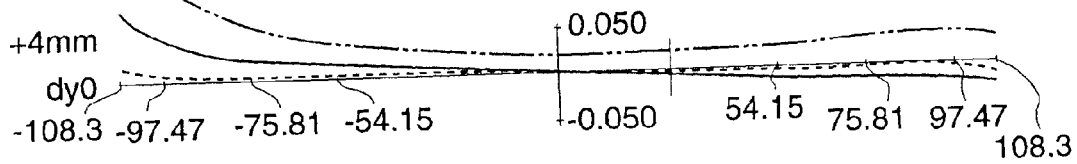
FIG. 13C
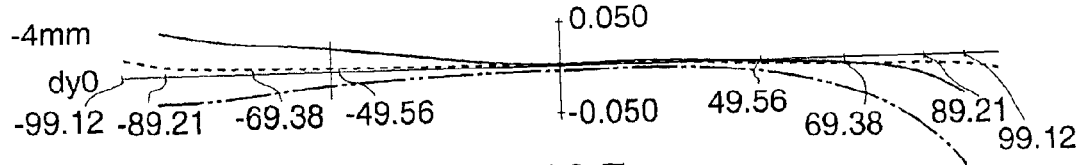

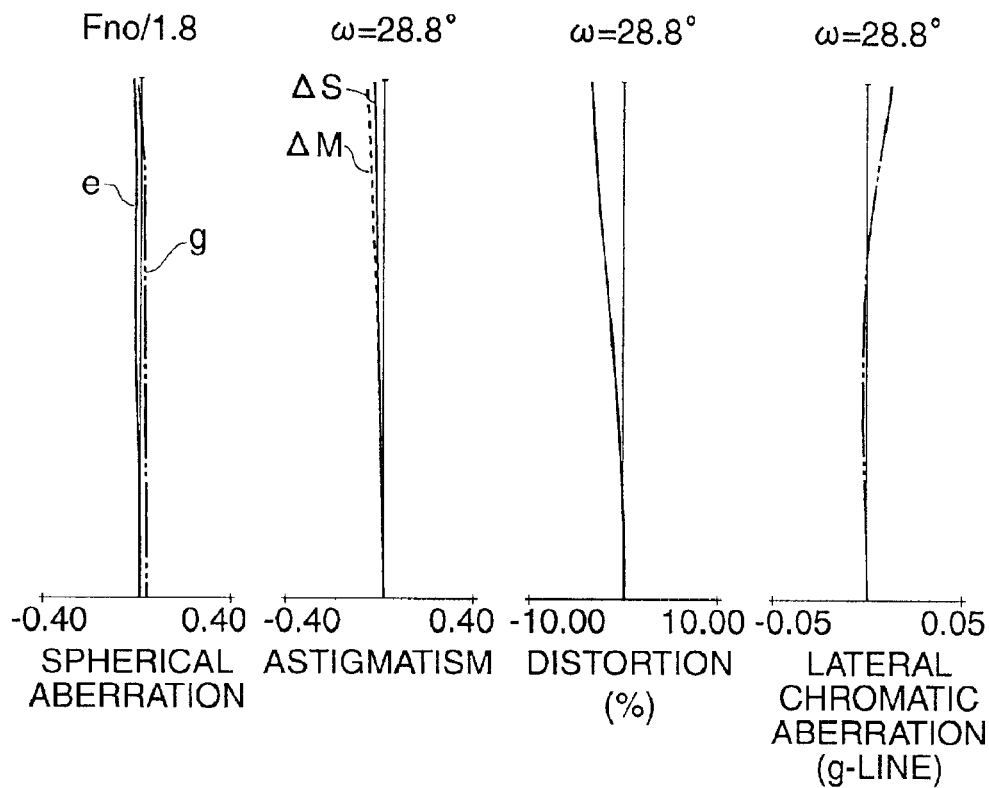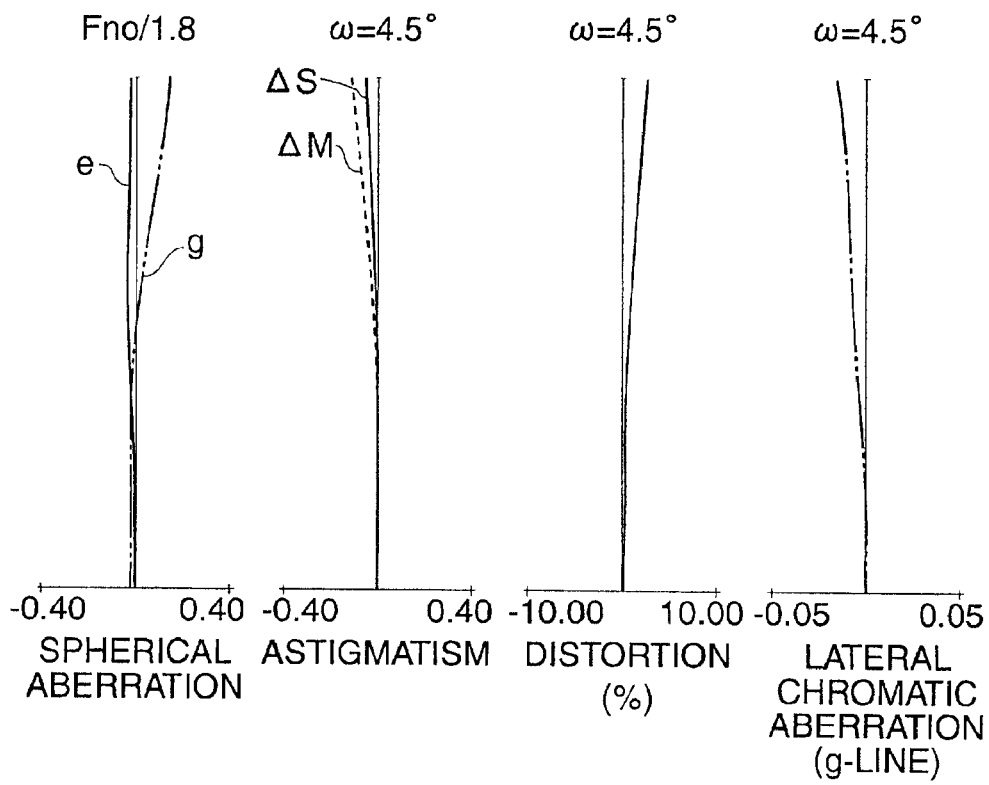

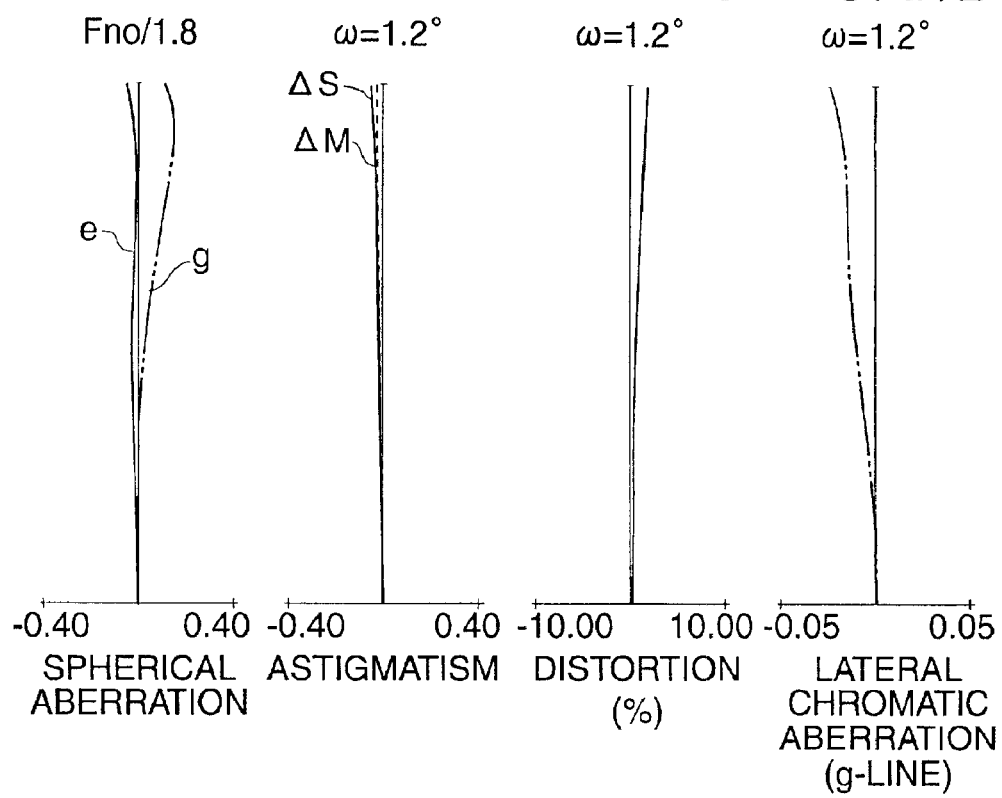
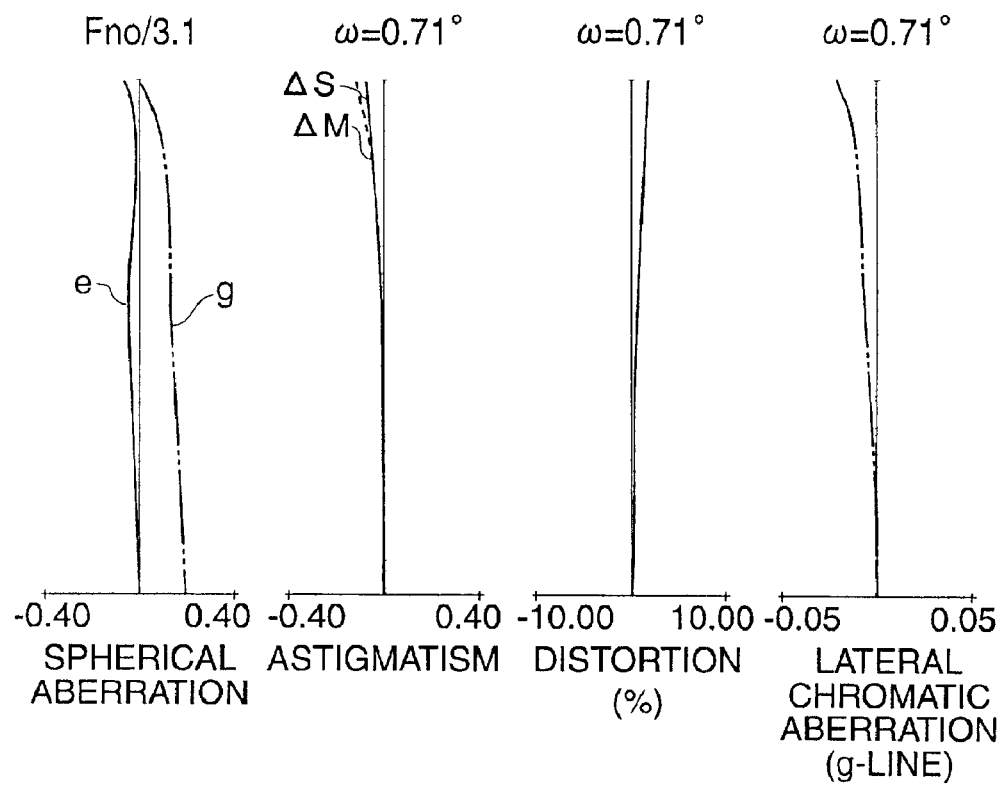

ZOOM LENS AND PHOTOGRAPHING APPARATUS HAVING THE SAME

BACKGROUND OF THE INVENTION

1. Field of the Invention

The present invention relates to a zoom lens having an image stabilizing function, and, more particularly, to a zoom lens having an image stabilizing function, which is suited for a television camera, a photographic camera, a video camera or the like, and which has high optical performance over the entire range of variable magnification even during an image stabilizing operation in which a lens unit that is a part of the lens system is made to move in a direction perpendicular to the optical axis so as to correct an image shake caused by the vibration of the zoom lens for the purpose of obtaining a stationary image, with the construction of the zoom lens, such as the refractive power arrangement of the whole zoom lens and the arrangement of the moving lens units for the variation of magnification, appropriately set. Further, the present invention relates to a photographing apparatus having such a zoom lens.

2. Description of Related Art

Heretofore, for use with a television camera, a photographic camera, a video camera or the like, there has been a demand for a zoom lens having high optical performance while having a large relative aperture and a high variable magnification ratio.

In addition to such a demand, in the case of a color television camera for broadcasting, in particular, importance is attached to operability and mobility. In response to such a requirement, the usage of a CCD (charge-coupled device) of ⅔ inch or ½ inch has become the mainstream for an image pickup device in the color television camera.

Since the CCD has an almost uniform resolution over the entire image pickup range, a zoom lens to be associated with the CCD is also required to have an almost uniform resolution from the center of an image plane to the periphery thereof.

For example, the zoom lens is required to have the various aberrations, such as coma, astigmatism and distortion, corrected well and to have high optical performance over the entire image plane. In addition, the zoom lens is required to have a large relative aperture, a wide angle of view and a high variable magnification ratio while being small in size and light in weight, and moreover to have a long back focal distance for enabling a color separation optical system and a variety of filters to be disposed in front of an image pickup means.

In addition, it has become a large problem to suppress an image shake caused by the vibration of a photographing system which has a long focal length or the vibration of hands holding the photographing system. Accordingly, a demand for an image stabilizing function of preventing an image shake has risen. Under the circumstances, there have been proposed a variety of types of image stabilizing methods.

In Japanese Laid-Open Patent Application No. Sho 61-223819, there has been proposed a photographing system in which a refraction-type variable angle prism is disposed on the most object side of the photographing system so as to stabilize an image by varying an apex angle of the refraction-type variable angle prism according to the vibration of the photographing system.

In Japanese Laid-Open Patent Application No. Hei 1-116619, Japanese Laid-Open Patent Application No. Hei 2-124521, etc., there has been proposed a method of obtaining a stationary image by detecting the vibration of a photographing system by means of an acceleration sensor or the like and causing a lens unit that is a part of the photographing system to shift in a direction perpendicular to the optical axis according to a signal obtained by the acceleration sensor or the like.

In Japanese Laid-Open Patent Application No. Hei 7-92431, there has been proposed a zoom lens comprising four lens units, i.e., in order from the object side, a first lens unit of positive refractive power, a second lens unit of negative refractive power, a third lens unit of positive refractive power and a fourth lens unit of positive refractive power, in which the fourth lens unit is composed of a front lens subunit of positive refractive power and a rear lens subunit of positive refractive power, and the shaking of a photographed image caused by the vibration of the zoom lens is corrected by moving the front lens subunit in a direction perpendicular to the optical axis.

In Japanese Laid-Open Patent Application No. Hei 10-90601, there has been proposed a zoom lens comprising five lens units, i.e., in order from the object side, a first lens unit of positive refractive power, a second lens unit of negative refractive power, a third lens unit of positive refractive power, a fourth lens unit of negative refractive power and a fifth lens unit of positive refractive power, in which the shaking of a photographed image caused by the vibration of the zoom lens is corrected by moving the fourth lens unit in a direction perpendicular to the optical axis.

In Japanese Laid-Open Patent Application No. Hei 5-232410, there has been proposed a telephoto-type zoom lens comprising four lens units, i.e., in order from the object side, first to fourth lens units of positive, negative, positive and positive refractive powers, respectively, in which the image stabilization is performed by moving the second lens unit in a direction perpendicular to the optical axis.

In Japanese Laid-Open Patent Application No. Hei 7-152002, there has been proposed a zoom lens comprising four lens units, i.e., in order from the object side, first to fourth lens units of negative, positive, negative and positive refractive powers, respectively, in which the image stabilization is performed by moving the third lens unit in a direction perpendicular to the optical axis.

In Japanese Laid-Open Patent Application No. Hei 7-199124, there has been proposed a variable magnification optical system comprising four lens units, i.e., in order from the object side, first to fourth lens units of positive, negative, positive and positive refractive powers, respectively, in which the image stabilization is performed by moving the whole of the third lens unit in a direction perpendicular to the optical axis.

In general, the method of obtaining a stationary image by disposing an image stabilizing optical system in front of a photographing system and driving and controlling a movable lens unit that is a part of the image stabilizing optical system to prevent the shaking of a photographed image causes such a problem that the whole apparatus becomes large in size and a moving mechanism for moving the movable lens unit becomes complicated.

In an optical system in which the image stabilization is performed by means of a variable angle prism, a problem arises in that the amount of occurrence of decentering lateral chromatic aberration becomes large, in particular, on the telephoto side during the image stabilization.

On the other hand, in an optical system in which the image stabilization is performed by causing a lens unit that is a part of a photographing system to decenter in a direction perpendicular to the optical axis, although there is such an advantage that it is unnecessary to provide a specific optical system used for the image stabilization, a problem arises in that a space is required for the lens unit to be moved and the amount of occurrence of decentering aberration during the image stabilization becomes large.

In the four-unit zoom lens composed of four lens units of positive, negative, positive and positive refractive powers, respectively, in which the image stabilization is performed by moving the front lens subunit of positive refractive power of the fourth lens unit in a direction perpendicular to the optical axis, as proposed in Japanese Laid-Open Patent Application No. Hei 7-92431, the front lens subunit of positive refractive power serving as an image-stabilizing lens unit has a relatively large effective diameter, and, as a result, there is a tendency for the image-stabilizing lens unit to become large and heavy to increase the size of a driving mechanism for the image-stabilizing lens unit.

In the five-unit zoom lens composed of five lens units of positive, negative, positive, negative and positive refractive powers, respectively, in which the image stabilization is performed by moving the fourth lens unit in a direction perpendicular to the optical axis, as proposed in Japanese Laid-Open Patent Application No. Hei 10-90601, since the fourth lens unit is a lens unit arranged to move in the optical axis direction during the variation of magnification, there is a tendency for a driving control mechanism for the fourth lens unit to become complicated.

BRIEF SUMMARY OF THE INVENTION

It is an object of the invention to provide a zoom lens having an image stabilizing function suited for the so-called four-unit zoom lens, in which the shaking of a photographed image is corrected by driving a lens unit that is a part of the zoom lens to decenter in a direction perpendicular to the optical axis, and each lens element of the zoom lens is appropriately set to reduce the size of the image-stabilizing lens unit and to correct well the various aberrations and decentering aberration. It is another object of the invention to provide a photographing apparatus having the above zoom lens.

To attain the above objects, in accordance with an aspect of the invention, there is provided a zoom lens comprising, in order from an object side to an image side, a first lens unit of positive refractive power, a second lens unit of negative refractive power arranged to move during variation of magnification, a third lens unit arranged to compensate for shift of an image plane due to the variation of magnification, and a fourth lens unit of positive refractive power, wherein the fourth lens unit has a first lens subunit of negative refractive power, and an image is displaced by moving the first lens subunit in such a way as to have a component perpendicular to an optical axis of the zoom lens.

In accordance with a preferred aspect of the invention, in the zoom lens, the first lens subunit consists of one positive lens and one negative lens.

In accordance with a preferred aspect of the invention, in the zoom lens, the first lens subunit consists of one positive lens and two negative lenses.

In accordance with a preferred aspect of the invention, in the zoom lens, the fourth lens unit further has a second lens subunit of positive refractive power on the image side of the first lens subunit.

In accordance with a preferred aspect of the invention, in the zoom lens, the third lens unit is of positive refractive power, and the fourth lens unit consists of, in order from the object side to the image side, the first lens subunit of negative refractive power and the second lens subunit of positive refractive power.

In accordance with a preferred aspect of the invention, in the zoom lens, the following condition is satisfied:

$$\alpha' - \alpha < -0.45$$

where $\alpha$ is a converted inclination angle of incidence on a lens surface on the most object side of the first lens subunit, and $\alpha'$ is a converted inclination angle of exit from a lens surface on the most image side of the first lens subunit.

In accordance with a preferred aspect of the invention, in the zoom lens, the following condition is satisfied:

$$\nu n(4F) - \nu p(4F) > 10$$

where $\nu n(4F)$ is, when the first lens subunit includes only one negative lens, an Abbe number of material of the negative lens included in the first lens subunit or, when the first lens subunit includes a plurality of negative lenses, a mean value of Abbe numbers of material of all the negative lenses included in the first lens subunit, and $\nu p(4F)$ is, when the first lens subunit includes only one positive lens, an Abbe number of material of the positive lens included in the first lens subunit or, when the first lens subunit includes a plurality of positive lenses, a mean value of Abbe numbers of material of all the positive lenses included in the first lens subunit.

In accordance with a preferred aspect of the invention, in the zoom lens, the following condition is satisfied:

$$\nu p(4R) - \nu n(4R) > 10$$

where $\nu p(4R)$ is, when the second lens subunit includes only one positive lens, an Abbe number of material of the positive lens included in the second lens subunit or, when the second lens subunit includes a plurality of positive lenses, a mean value of Abbe numbers of material of all the positive lenses included in the second lens subunit, and $\nu n(4R)$ is, when the second lens subunit includes only one negative lens, an Abbe number of material of the negative lens included in the second lens subunit or, when the second lens subunit includes a plurality of negative lenses, a mean value of Abbe numbers of material of all the negative lenses included in the second lens subunit.

In accordance with a preferred aspect of the invention, in the zoom lens, an image forming magnification of the second lens unit varies within a range including $-1\times$ during the variation of magnification, an image forming magnification of the third lens unit varies within a range including $-1\times$ during the variation of magnification, and the following conditions are satisfied:

$$5 < Z2$$

$$0.15 < Z2/Z$$

where $Z2$ is a rate of variation of lateral magnification of the second lens unit, and $Z$ is a zoom ratio of the zoom lens.

In accordance with a preferred aspect of the invention, in the zoom lens, an extender conversion optical system for varying the focal length of the zoom lens is insertably and detachably disposed in a position on the image side of the first lens subunit.

In accordance with another aspect of the invention, there is provided a photographing apparatus, comprising a zoom lens comprising, in order from an object side to an image side, a first lens unit of positive refractive power, a second lens unit of negative refractive power, a third lens unit of positive refractive power and a fourth lens unit of positive refractive power, wherein the fourth lens unit has a first lens subunit of negative refractive power, and an image is displaced by moving the first lens subunit in such a way as to have a component perpendicular to an optical axis of the zoom lens, and a casing holding the zoom lens.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 1 is a sectional view showing the construction of a zoom lens at the wide-angle end according to a numerical example 1 of the invention.

FIGS. 2A to 2D are aberration diagrams showing the various aberrations at the wide-angle end in the zoom lens according to the numerical example 1 of the invention.

FIGS. 3A to 3D are aberration diagrams showing the various aberrations at the focal length f of 69.79 mm in the zoom lens according to the numerical example 1 of the invention.

FIGS. 4A to 4D are aberration diagrams showing the various aberrations at the focal length f of 257.37 mm in the zoom lens according to the numerical example 1 of the invention.

FIGS. 5A to 5D are aberration diagrams showing the various aberrations at the telephoto end in the zoom lens according to the numerical example 1 of the invention.

FIGS. 12A to 12C are aberration diagrams showing lateral aberrations when the image-stabilizing lens unit has shifted 3.00 mm at the focal length f of 257.37 mm in the zoom lens according to the numerical example 1 of the Invention.

FIGS. 13A to 13C are aberration diagrams showing lateral aberrations when the image-stabilizing lens unit has shifted 3.00 mm at the telephoto end in the zoom lens according to the numerical example 1 of the invention.

FIGS. 15A to 15D are aberration diagrams showing the various aberrations at the wide-angle end in the zoom lens according to the numerical example 2 of the invention.

FIGS. 16A to 16D are aberration diagrams showing the various aberrations at the focal length f of 69.79 mm in the zoom lens according to the numerical example 2 of the invention.

FIGS. 17A to 17D are aberration diagrams showing the various aberrations at the focal length f of 257.37 mm in the zoom lens according to the numerical example 2 of the invention.

FIGS. 18A to 18D are aberration diagrams showing the various aberrations at the telephoto end in the zoom lens according to the numerical example 2 of the invention.

DETAILED DESCRIPTION OF THE INVENTION

Figure 6A:
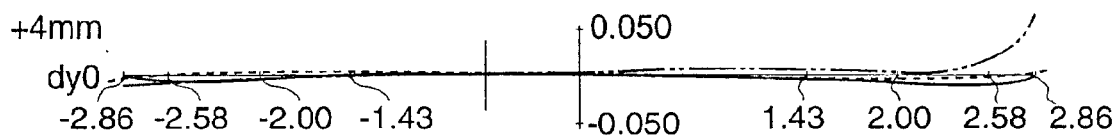
FIGS. 6A to 6C are aberration diagrams showing lateral aberrations at the wide-angle end in the zoom lens according to the numerical example 1 of the invention.
Figure 6B:
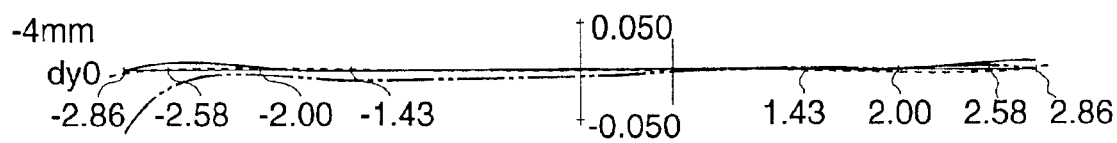
Figure 6C:
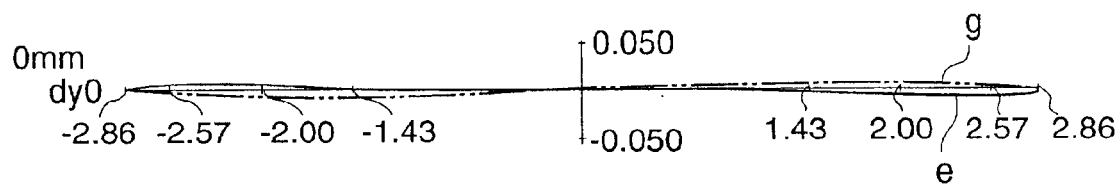
Figure 7A:
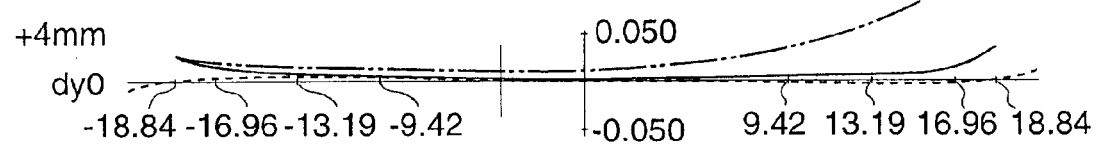
FIGS. 7A to 7C are aberration diagrams showing lateral aberrations at the focal length f of 69.79 mm in the zoom lens according to the numerical example 1 of the invention.
Figure 7B:
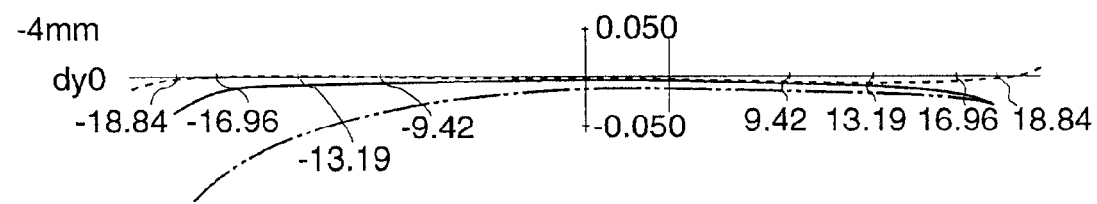
Figure 7C:
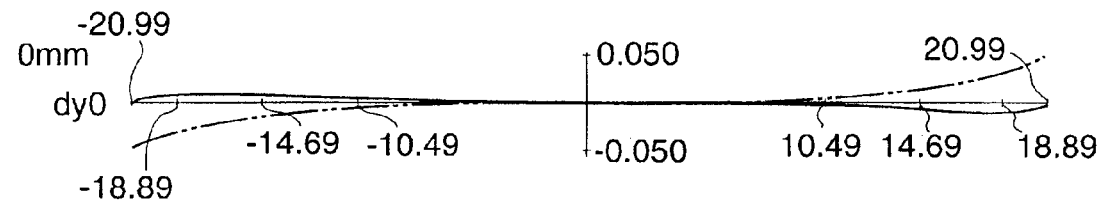
Figure 8A:
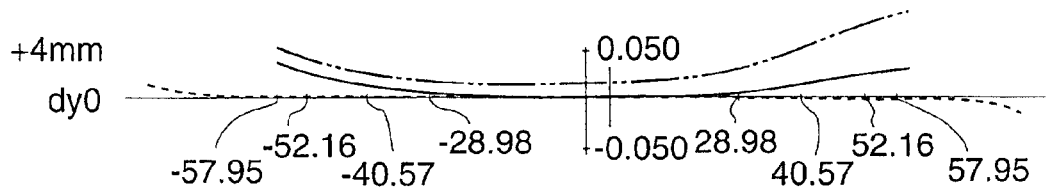
FIGS. 8A to 8C are aberration diagrams showing lateral aberrations at the focal length f of 257.37 mm in the zoom lens according to the numerical example 1 of the invention.
Figure 8B:
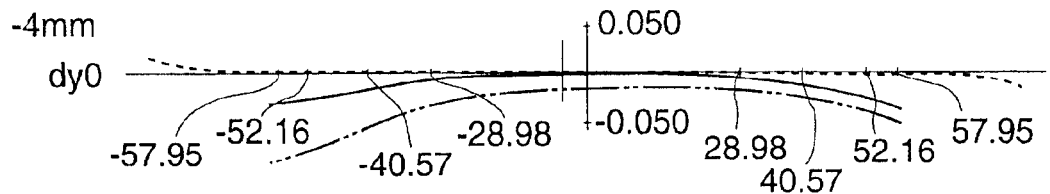
Figure 8C:
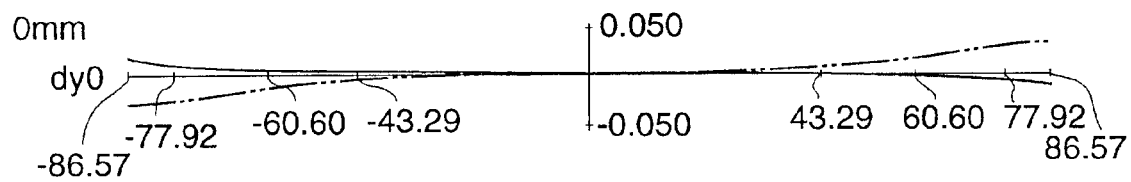
Figure 9A:
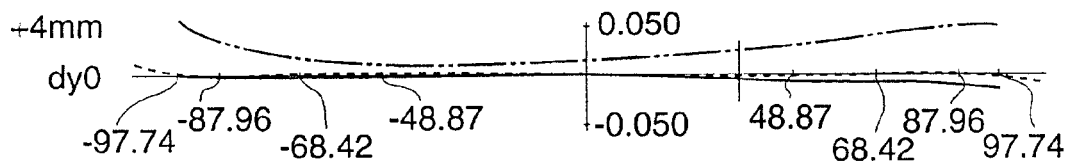
FIGS. 9A to 9C are aberration diagrams showing lateral aberrations at the telephoto end in the zoom lens according to the numerical example 1 of the invention.
Figure 9B:
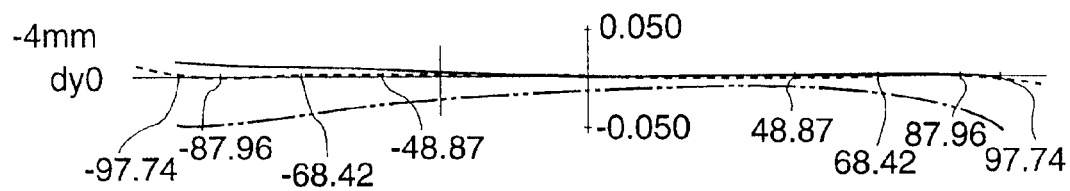
Figure 9C:
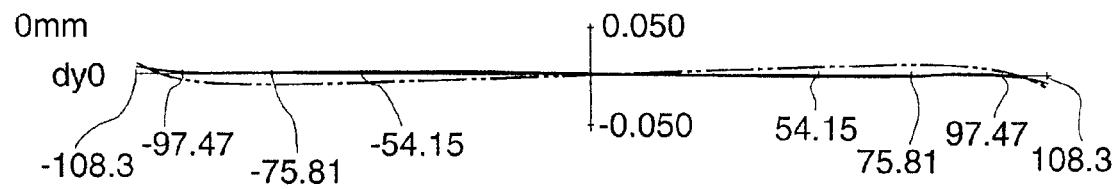
Figure 10A:
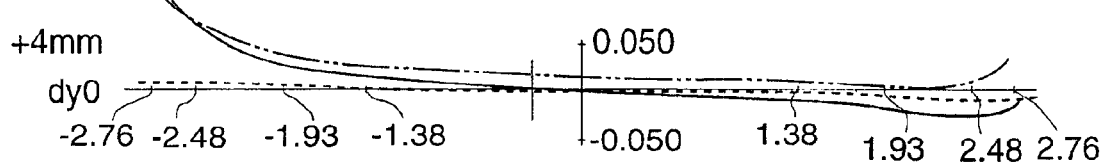
FIGS. 10A to 10C are aberration diagrams showing lateral aberrations when the image-stabilizing lens unit has shifted 3.00 mm at the wide-angle end in the zoom lens according to the numerical example 1 of the invention.
Figure 10B:
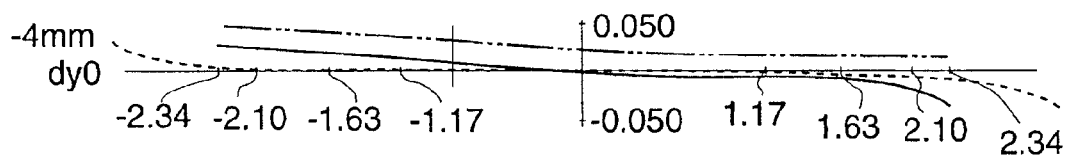
Figure 10C:
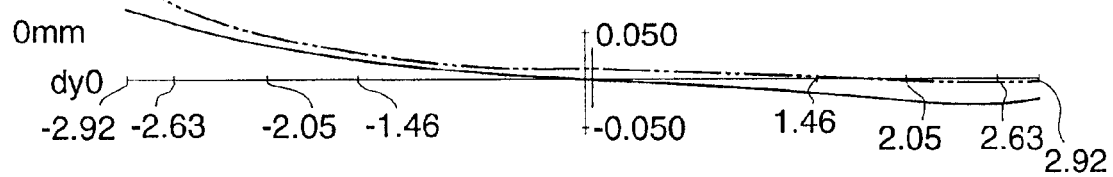
Figure 11A:
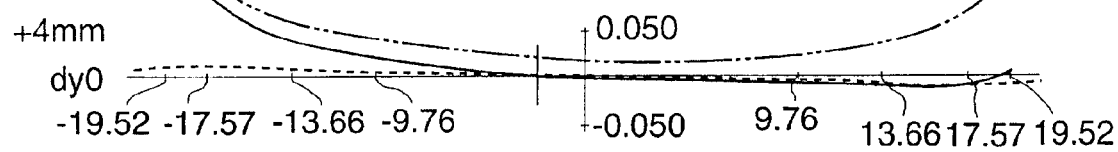
FIGS. 11A to 11C are aberration diagrams showing lateral aberrations when the image-stabilizing lens unit has shifted 3.00 mm at the focal length f of 69.79 mm in the zoom lens according to the numerical example 1 of the invention.
Figure 11B:
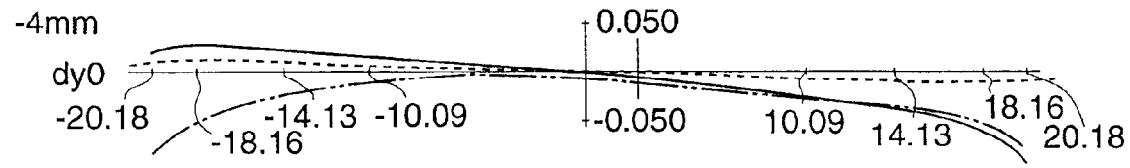
Figure 11C:
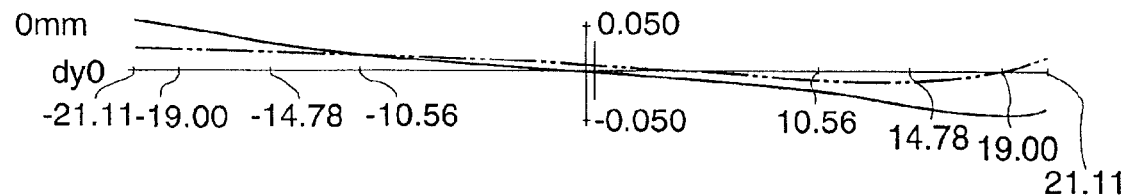

Hereinafter, preferred embodiments of the invention will be described in detail with reference to the drawings.

First, in a zoom lens having an image stabilizing function according to the invention, the occurrence of decentering aberration when a lens unit that is a part of the zoom lens has been moved to decenter in a direction perpendicular to the optical axis will be discussed, from the standpoint of aberration theory, on the basis of the method shown by Matsui in the 23rd Applied Physics Lecture Meeting in Japan (1962).

The amount of aberration $\Delta'Y$ of the entire lens system occurring when a lens unit p that is a part of the photographic lens is parallel-decentered by a distance E becomes the sum of the amount of aberration ΔY occurring before the parallel-decentering and the amount of decentering aberration ΔY(E) produced by the parallel-decentering, as shown in the equation (a). Here, the amount of decentering aberration ΔY(E) is represented, as shown in the equation (b), by using primary decentering coma (IIE), primary decentering astigmatism (IIIE), primary decentering curvature of field (PE), primary decentering distortion (VE1), primary decentering surplus distortion (VE2) and primary original point shift ΔE. ($\alpha'_k$ is the converted inclination angle of exit of outermost surface k in the entire lens system.)

Also, the various aberrations (IIE) to (ΔE) shown in the equations (c) to (h) are represented by using aberration coefficients $I_p$, $II_p$, $III_p$, $P_p$ and $V_p$ of the decentering lens unit and aberration coefficients $I_q$, $II_q$, $III_q$, $P_q$ and $V_q$ of a lens system disposed on the image side of the decentering lens unit, where, when the focal length of the entire lens system is normalized to "1", an incidence angle and an exit angle of an on-axial marginal ray of light on and from the decentering lens unit are denoted by $\alpha_p$ and $\alpha_p'$, respectively, and an incidence angle of a principal ray passing through the pupil center is denoted by $\overline{\alpha}_p$.

Similarly, the amount of chromatic aberration ΔcYa of the entire lens system occurring when the lens unit p is parallel-decentered by the distance E becomes the sum of the amount of chromatic aberration ΔcY occurring before the parallel-decentering and the amount of decentering chromatic aberration ΔcY(E) produced by the parallel-decentering, as shown in the equation (i).

Here, the amount of chromatic aberration ΔcY occurring before the parallel-decentering and the amount of decentering chromatic aberration ΔcY(E) produced by the parallel-decentering can be expressed by using longitudinal chromatic aberration L, lateral chromatic aberration T and primary decentering chromatic aberration TE, as shown in the equations (j) and (k).

Also, the primary decentering chromatic aberration TE in the equation (1) can be expressed by using chromatic aberration coefficients $L_p$ and $T_p$ of the lens unit p and chromatic aberration coefficients $L_q$ and $T_q$ of the whole lens system disposed on the image side of the decentering lens unit.

$$\Delta Y = \Delta Y + \Delta Y(E) \quad \text{(a)}$$

$$\Delta Y(E) = -\frac{E}{2\alpha'_k}[R^2(2+\cos 2\phi_R)(IIE) + 2R(N_1\tan\omega)[\{2\cos(\phi_R-\phi_\omega)+\cos(\phi_R+\phi_\omega)\}(IIIE) + \cos\phi_R\phi_\omega(PE)] + (N_1\tan\omega)^2\{(2+2\cos\phi_\omega)(VE1) - (VE2)\}] - \frac{1}{2\alpha'_k}\{E(\Delta E)\} \quad \text{(b)}$$

$$(IIE) = \alpha'_p II_q - \alpha_p(II_p + II_q) - \overline{\alpha'_p}I_q + \overline{\alpha}_p(I_p + I_q) \quad \text{(c)}$$

$$(IIIE) = \alpha'_p III_q - \alpha_p(III_p + III_q) - \overline{\alpha'_p}II_q + \overline{\alpha}_p(II_p + II_q) \quad \text{(d)}$$

$$(PE) = \alpha'_p P_q - \alpha_p(P_p + P_q) \quad \text{(e)}$$

$$(VE1) = \alpha'_p V_q - \alpha_q(V_p + V_q) - \overline{\alpha'_p}III_q + \overline{\alpha}_p(III_p + III_q) \quad \text{(f)}$$

$$(VE2)\ \overline{\alpha'_p}P_q - \overline{\alpha}_p(P_p + P_q) \quad \text{(g)}$$

$$(\Delta E) = -2(\alpha'_p - \alpha_p) \quad \text{(h)}$$

$$\Delta cYa = \Delta cY + \Delta cY(E) \quad \text{(i)}$$

$$\Delta cY = -\frac{1}{\alpha'_k}\{LR\cos\phi_R + TN\tan\omega\cos\phi_\omega\} \quad \text{(j)}$$

$$\Delta cY(E) = -\frac{E}{\alpha'_k}(TE) \quad \text{(k)}$$

$$(TE) = \alpha'_p T_q - \alpha_p(T_p + T_q) - \overline{\alpha'_p}L_q + \overline{\alpha}_p(L_p + L_q) \quad \text{(l)}$$

Among the above items, the one that represents the movement of an image caused by the decentering is the primary original point shift (ΔE), and the ones that influence the image forming performance are the primary decentering coma (IIE), primary decentering astigmatism (IIIE), primary decentering curvature of field (PE) and primary decentering chromatic aberration (TE).

In order to lessen the occurrence of decentering aberration, first, it is necessary to lessen the amount of decentering E of the lens unit p, as indicated in the equation (b).

In order to make the various decentering aberrations of the lens unit p shown in the equations (c) to (g) very small, it becomes necessary to set each of the various aberration coefficients $I_p$, $II_p$, $III_p$, $P_p$ and $V_p$ of the lens unit p to a small value, or it becomes necessary to set the various aberration coefficients $I_p$, $II_p$, $III_p$, $P_p$ and $V_p$ in a well-balanced manner in such a way as to cancel each other.

In particular, in order for each of the various decentering aberrations shown in the equations (c) to (g) to have a small value, it becomes necessary to set the converted inclination angles of a paraxial ray incident on and exiting from the parallel-decentering lens unit p, the tertiary aberration coefficients of the lens unit p, and the tertiary aberration coefficients of the whole lens unit q disposed on the image side of the lens unit p, to the respective appropriate values.

In other words, in order to eliminate the deterioration of a central image occurring when the lens unit is parallel-decentered in a direction perpendicular to the optical axis, it becomes necessary to correct well, mainly, the primary decentering coma shown in the equation (c), and, at the same time, in order to correct well one-sided blurring occurring when the lens unit is parallel-decentered, it becomes necessary to correct well, mainly, the primary decentering curvature of field shown in the equation (d).

As a matter of course, it is necessary to correct well the other various aberrations.

In order to make the decentering chromatic aberration (TE) shown in the equation (1) very small, it becomes necessary to set the chromatic aberration coefficients of the lens unit p and the whole lens unit q disposed on the image side of the lens unit p, to the respective appropriate values.

The zoom lens having an image stabilizing function according to the invention is constructed with the above-mentioned points taken into consideration.

Next, the concrete construction of the zoom lens according to an embodiment of the invention will be described.

Figure 27A:
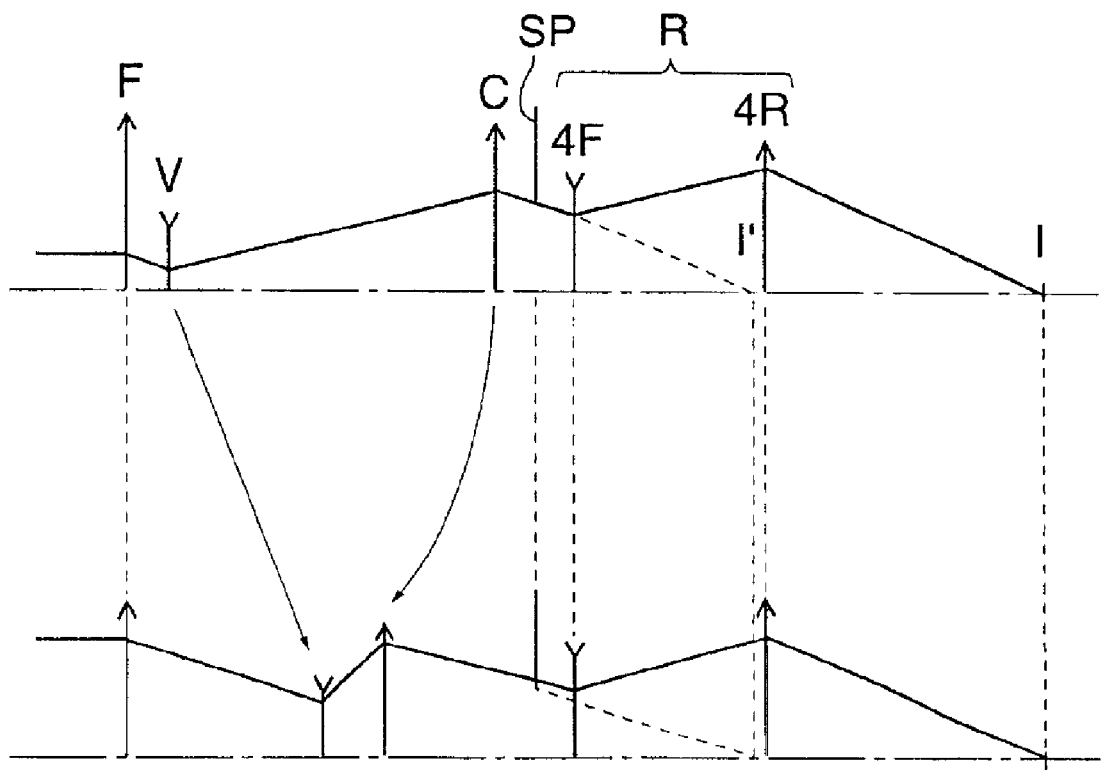
FIG. 27A is an optical conceptual diagram showing an image-stabilizing zoom lens according to the invention.

FIG. 27A is a conceptual diagram of the zoom lens having an image stabilizing function. In FIG. 27A, reference character F denotes a focusing lens unit (front lens unit), serving as a first lens unit, of positive refractive power.

Reference character V denotes a variator, serving as a second lens unit, of negative refractive power for the variation of magnification. The variation of magnification from the wide-angle end to the telephoto end is effected by moving the variator V monotonically toward the image side along the optical axis.

Reference character C denotes a compensator, serving as a third lens unit, of positive refractive power, which is arranged to move nonlinearly toward the object side along the optical axis so as to compensate for the shift of an image plane caused by the variation of magnification. The variator V and the compensator C constitute a magnification varying system. Incidentally, the compensator C may be of negative refractive power. Reference character SP denotes a stop, and reference character R denotes a stationary relay lens unit, serving as a fourth lens unit, of positive refractive power as a whole. The relay lens unit R is composed of a lens subunit 4F of negative refractive power and a lens subunit 4R of positive refractive power.

As shown in FIG. 27A, an image point I' formed by the lens unit F through the lens unit C does not vary in position during the variation of magnification. Accordingly, taking into consideration the image forming relationship of the relay lens unit R only, the arrangement and the paraxial tracing value of the relay lens unit R are unvaried irrespective of the variation of magnification. Therefore, by disposing the image-stabilizing lens unit in a lens unit disposed on the image side of the magnification varying lens units and arranged to be stationary during the variation of magnification, it is possible to prevent the variation of the various decentering aberrations due to the variation of magnification.

Further, by using, as the image-stabilizing lens unit, the lens subunit 4F of negative refractive power disposed on the object side of the lens subunit 4R of positive refractive power, or a lens unit that is a part of the lens subunit 4F, it is possible to reduce the effective diameter of the image-stabilizing lens unit, thereby attaining the reduction in size and weight of the image-stabilizing lens unit and the reduction in size of the whole image stabilizing device.

According to the embodiment of the invention, the zoom lens further has the following characteristic features, thereby obtaining the more advantageous effects.

First, the conditions under which the image stabilizing lens unit is made small in size and light in weight and is made optimum in terms of optical performance will be described in the following. The amount of decentering E4s of the image-stabilizing lens unit required for obtaining a predetermined amount of image-shake correction $\Delta Y_p$ on an image plane is expressed by the following equation (m) on the basis of the equation (b) with R=0, ω=0 and $\alpha_k$=1.

$$E4s = -\Delta Y_p / \{2(\Delta E)\} \quad (m)$$

Since the primary original point shift (ΔE) is expressed by the equation (h), the amount of decentering E4s required for obtaining a necessary amount of image-shake correction $\Delta Y_p$ is defined by using a converted inclination angle of incidence α and a converted inclination angle of exit α' of an on-axial marginal ray on and from the image-stabilizing lens unit. Accordingly, the zoom lens is made to satisfy the following condition (1):

$$\alpha' - \alpha < -0.45 \quad (1)$$

If the condition (1) is not satisfied, the increase of the amount of decentering E4s causes the amount of movement of the image-stabilizing lens unit to increase rapidly, and, in addition, the effective diameter of the image-stabilizing lens unit is increased in consideration of the decentering, so that the required driving force increases rapidly, resulting in an increase in size of the whole mechanism. Further, in association with the increase of the amount of decentering E4s, the occurrence of decentering aberration becomes large, so that the optical performance during the image stabilizing operation deteriorates.

In addition, the image-stabilizing lens unit may be composed of one negative lens. However, since, from the viewpoint of the equations (c) to (g), in order to correct decentering aberrations caused by the image-stabilizing lens unit, it is necessary to appropriately control the various shared values of aberration coefficients of the image-stabilizing lens unit, it is preferable that the image-stabilizing lens unit is composed of at least one positive lens and at least one negative lens. By this arrangement, it becomes easy to control the various shared values of aberration coefficients of the image-stabilizing lens unit. Thus, it becomes easy to correct decentering aberrations, so that the various decentering aberrations, such as decentering coma and decentering curvature of field, can be prevented from easily occurring during the image stabilizing operation. It is more preferable that the image-stabilizing lens unit consists of one positive lens and one negative lens or consists of one positive lens and two negative lenses.

Further, from the viewpoint of the equation (l), in order to correct decentering chromatic aberrations caused by the image-stabilizing lens unit, it is necessary to appropriately control the various shared values of chromatic aberration coefficients of the image-stabilizing lens unit.

Accordingly, the zoom lens is made to satisfy the following condition (2):

$$vn(4F) - vp(4F) > 10 \quad (2)$$

where vn(4F) is, when the image-stabilizing lens unit includes only one negative lens, an Abbe number of material of the negative lens included in the image-stabilizing lens unit or, when the image-stabilizing lens unit includes a plurality of negative lenses, a mean value of Abbe numbers of material of all the negative lenses included in the image-stabilizing lens unit, and vp(4F) is, when the image-stabilizing lens unit includes only one positive lens, an Abbe number of material of the positive lens included in the image-stabilizing lens unit or, when the image-stabilizing lens unit includes a plurality of positive lenses, a mean value of Abbe numbers of material of all the positive lenses included in the image-stabilizing lens unit.

If the condition (2) is not satisfied, it becomes difficult to control the various chromatic aberration coefficients of the image-stabilizing lens unit. Thus, it becomes difficult to correct decentering chromatic aberrations, so that the asymmetry of color becomes apt to occur during the image stabilizing operation.

Next, the conditions for the lens subunit 4R appropriate in terms of optical performance will be described in the following.

From the viewpoint of the equations (c) to (g), in order to correct decentering aberrations caused by the image-stabilizing lens unit, it is necessary to appropriately control the various shared values of aberration coefficients of a lens unit disposed on the image side of the image-stabilizing lens unit.

Accordingly, if the lens subunit 4R disposed on the image side of the image-stabilizing lens unit is not made to be composed of at least one positive lens and at least one negative lens, it becomes difficult to control the various shared values of aberration coefficients. Thus, it becomes difficult to correct decentering aberrations, so that the various decentering aberrations, such as decentering coma and decentering curvature of field, become apt to occur. Further, from the viewpoint of the equation (1), in order to correct decentering chromatic aberrations caused by the image-stabilizing lens unit, it is necessary to appropriately control the various shared values of chromatic aberration coefficients of a lens unit disposed on the image side of the image-stabilizing lens unit. Accordingly, the zoom lens is made to satisfy the following condition (3):

$$vp(4R) - vn(4R) > 10 \quad (3)$$

where vp(4R) is, when the lens subunit 4R includes only one positive lens, an Abbe number of material of the positive lens included in the lens subunit 4R or, when the lens subunit 4R includes a plurality of positive lenses, a mean value of Abbe numbers of material of all the positive lenses included in the lens subunit 4R, and vn(4R) is, when the lens subunit 4R includes only one negative lens, an Abbe number of material of the negative lens included in the lens subunit 4R or, when the lens subunit 4R includes a plurality of negative lenses, a mean value of Abbe numbers of material of all the negative lenses included in the lens subunit 4R.

If the condition (3) is not satisfied, it becomes difficult to control the various chromatic aberration coefficients of the lens subunit 4R disposed on the image side of the image-stabilizing lens unit. Thus, it becomes difficult to correct decentering chromatic aberrations of the image-stabilizing lens unit, so that the asymmetry of color becomes apt to occur during the image stabilizing operation.

Further, in the zoom lens according to the embodiment of the invention, such a high zoom ratio as 40× or more is attained by effecting the variation of lateral magnification with the third lens unit as well as the second lens unit. For that purpose, an image forming magnification of the second lens unit varies within a range including −1× during the variation of magnification, an image forming magnification of the third lens unit varies within a range including −1× during the variation of magnification, and the following conditions are satisfied:

$$5 < Z2 \quad (4)$$

$$0.15 < Z2/Z \quad (5)$$

where Z2 is a rate of variation of lateral magnification of the second lens unit, and Z is a zoom ratio of the zoom lens.

If the conditions (4) and (5) are not satisfied, it becomes difficult to obtain a zoom lens having a high variable magnification ratio.

Figure 27B:
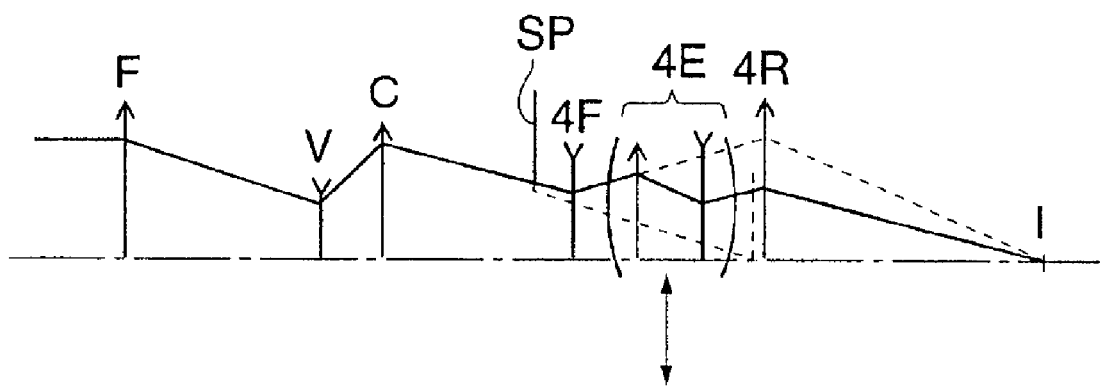
FIG. 27B is an optical conceptual diagram showing the image-stabilizing zoom lens when an extender conversion optical system is inserted into the fourth lens unit.

Further, in the zoom lens according to embodiment of the invention, an optical system (4E) for shifting the range of variable magnification toward the telephoto side or the wide-angle side may be made to be located on the image side of the image-stabilizing lens unit by such a unit switching method as to detachably insert a lens unit, such as a built-in extender conversion optical system. In that instance, it is unnecessary to change the control of the image-stabilizing lens unit before and after the shift of the range of variable magnification. FIG. 27B is an optical conceptual diagram showing the zoom lens when the extender conversion optical system (focal-length conversion optical system) 4E is inserted in a position on the image side of the image-stabilizing lens unit. Since, as shown in FIG. 27B, the disposition of lens units on the object side of the image-stabilizing lens unit does not change before and after the shift of the focal length due to the insertion or detachment of the extender conversion optical system 4E, the amount of decentering E4s of the image-stabilizing lens unit required for obtaining a desired correction angle θ also does not change, so that it is unnecessary to change the control of the image-stabilizing lens unit.

Next, the construction of each of zoom lenses according to numerical examples 1 and 2 of the invention will be described.

FIG. 1 is a sectional view showing the construction of a zoom lens at the wide-angle end according to the numerical example 1 of the invention. In FIG. 1, reference character F denotes a focusing lens unit (front lens unit), serving as a first lens unit, of positive refractive power. Reference character V denotes a variator, serving as a second lens unit, of negative refractive power for the variation of magnification. The variation of magnification from the wide-angle end to the telephoto end is effected by moving the variator V monotonically toward the image side along the optical axis.

Reference character C denotes a compensator, serving as a third lens unit, of positive refractive power, which is arranged to move nonlinearly toward the object side along the optical axis so as to compensate for the shift of an image plane caused by the variation of magnification. The variator V and the compensator C constitute a magnification varying system.

Reference character SP denotes a stop, and reference character R denotes a stationary relay lens unit, serving as a fourth lens unit, of positive refractive power as a whole. Reference character P denotes a color separation prism, an optical filter or the like, which is illustrated as a glass block in FIG.

The fourth lens unit is composed of a lens subunit 4F of negative refractive power and a lens subunit 4R of positive refractive power. The whole lens subunit 4F serves as the image-stabilizing lens unit, having the function of moving in a direction perpendicular to the optical axis for the purpose of stabilizing an image.

The image-stabilizing lens unit is composed of one negative lens and one positive lens. When a converted inclination angle of incidence of a light flux on the image-stabilizing lens unit is denoted by α, a converted inclination angle of exit of a light flux from the image-stabilizing lens unit 4F denoted by α', an Abbe number of material of the negative lens of the image-stabilizing lens unit is denoted by vn(4F), and an Abbe number of material of the positive lens of the image-stabilizing lens unit is denoted by vp(4F), the above-mentioned conditions (1) and (2) are satisfied as shown by the following values:

$$\alpha' - \alpha = -0.503$$

$$vn(4F) - vp(4F) = 22.7$$

$$(vn(4F) = 46.6,$$

$$vp(4F) = 23.9)$$

Further, the lens subunit 4R is composed of five positive lenses and three negative lenses. When a mean value of Abbe numbers of material of the positive lenses of the lens subunit 4R is denoted by vp(4R), and a mean value of Abbe numbers of material of the negative lenses of the lens subunit 4R is denoted by vn(4R), the above-mentioned condition (3) is satisfied as shown by the following values:

$$vp(4R) - vn(4R) = 12.1$$

$$(vp(4R) = 53.5,$$

$$vn(4R) = 41.4)$$

Further, the various decentering aberration coefficients, factors, etc., corresponding to the above equations (c) to (h) and (l) are listed in Table-1 with the image-stabilizing lens unit denoted by p, and the lens unit disposed on the image side of the image-stabilizing lens unit denoted by q.

By appropriately setting the converted inclination angles of incidence and exit on and from the image-stabilizing lens unit, and the shared values of aberration coefficients of the image-stabilizing lens unit and the lens unit disposed on the image side of the image-stabilizing lens unit, it is possible to make the decentering aberration coefficients of the image-stabilizing lens unit very small.

TABLE 1

| $\alpha_p$ | 1.0492 | $L_p$ | 0.0201 | $L_q$ | −0.0233 | TE | −0.0037 |
|---|---|---|---|---|---|---|---|
| $\alpha_p'$ | 0.5167 | $T_p$ | 0.0008 | $T_q$ | −0.0025 | IIE | −0.0140 |
| $\overline{\alpha_p}$ | −0.1917 | $I_p$ | −7.6750 | $I_q$ | 0.7828 | IIIE | 0.0015 |
| $\overline{\alpha_p'}$ | −0.2024 | $II_p$ | 1.3426 | $II_q$ | 0.1600 | PE | 0.0017 |
| | | $III_p$ | −0.0682 | $III_q$ | −0.3485 | VE1 | 0.0198 |
| | | $P_p$ | −0.0636 | $P_q$ | 0.1221 | VE2 | −0.0135 |
| | | $V_p$ | −0.0053 | $V_q$ | −0.00919 | ΔE | 1.0651 |

The rate of variation Z2 of lateral magnification of the second lens unit is 9.21, and the zoom ratio Z is 44.1, so that the above conditions (4) and (5) are satisfied.

FIGS. 2A to 2D through FIGS. 5A to 5D are aberration diagrams showing the various longitudinal aberrations at the wide-angle end, at the focal length f of 69.79 mm, at the focal length f of 257.37 mm and at the telephoto end, respectively, in the zoom lens according to the numerical example 1.

FIGS. 6A to 6C through FIGS. 9A to 9C are aberration diagrams showing lateral aberrations, with the image height being 0 mm and ±4 mm, at the wide-angle end, at the focal length f of 69.79 mm, at the focal length f of 257.37 mm and at the telephoto end, respectively, in the zoom lens according to the numerical example 1.

FIGS. 10A to 10C through FIGS. 13A to 13C are aberration diagrams showing lateral aberrations, with the image height being 0 mm and ±4 mm, when the image stabilizing lens unit has shifted at the wide-angle end, at the focal length f of 69.79 mm, at the focal length f of 257.37 mm and at the telephoto end, respectively, in the zoom lens according to the numerical example 1.

Incidentally, while, in the numerical example 1, the image-stabilizing lens unit is composed of the whole lens subunit 4F, this arrangement may be changed to such a construction that the lens subunit 4F, with the number of constituent lenses thereof increased, is divided into a plurality of lens units and a certain lens unit among the plurality of lens units is made to be the image-stabilizing lens unit.

As described above, in the numerical example 1, the refractive power arrangement of the entire lens system, the arrangement of the magnification varying lens units and the arrangement of the image-stabilizing lens unit in the fourth lens unit are appropriately set, and the lens construction of the image-stabilizing lens unit is also appropriately set. Accordingly, it is possible to obtain high optical performance over the entire range of variable magnification even during the image stabilizing operation.

Figure 14:
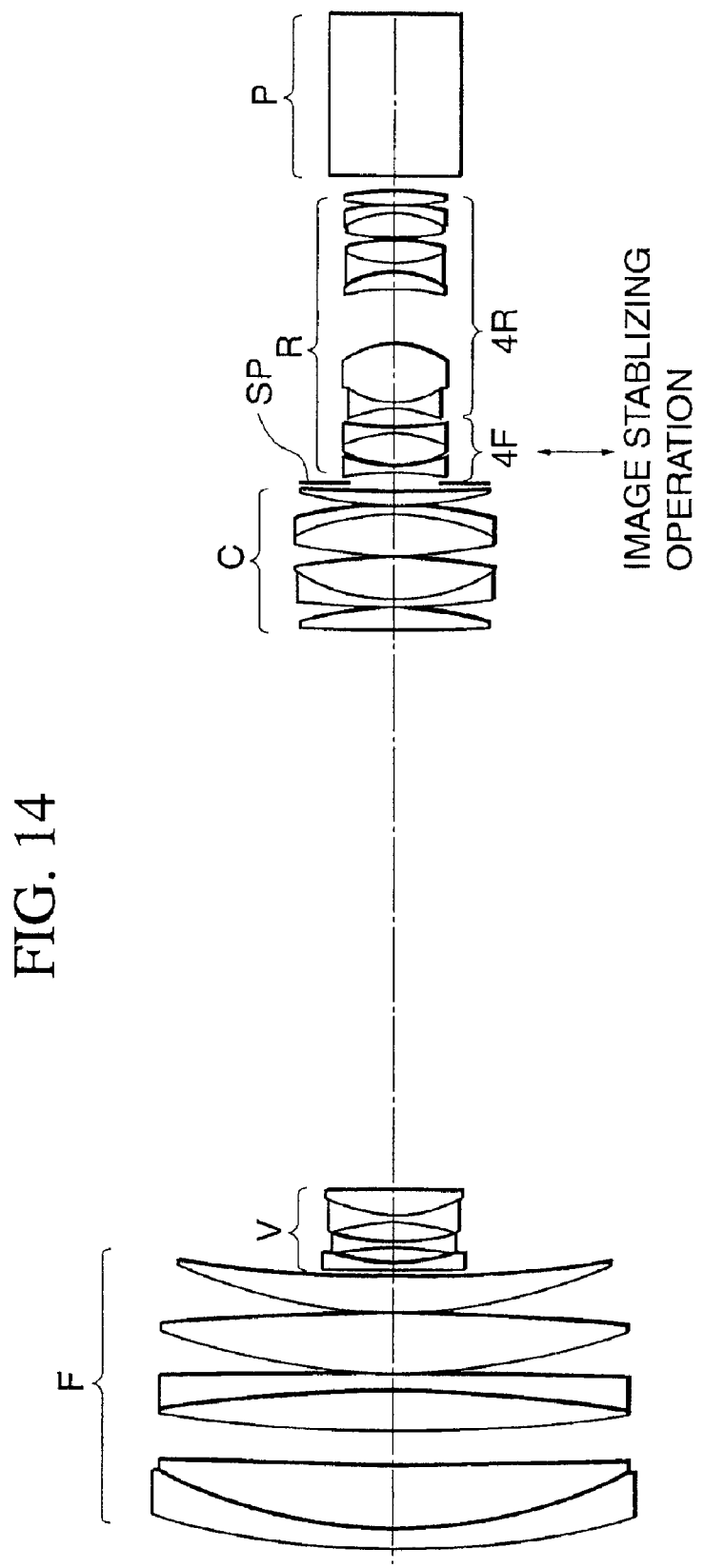
FIG. 14 is a sectional view showing the construction of a zoom lens at the wide-angle end according to a numerical example 2 of the invention.
Figure 19A:
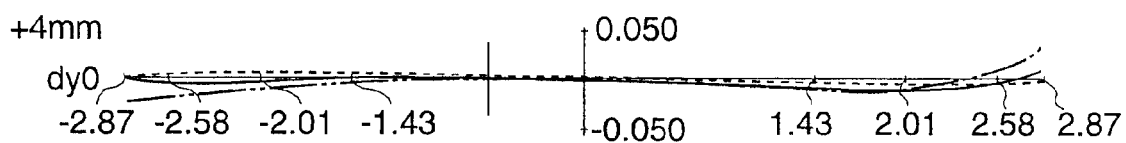
FIGS. 19A to 19C are aberration diagrams showing lateral aberrations at the wide-angle end in the zoom lens according to the numerical example 2 of the invention.
Figure 19B:
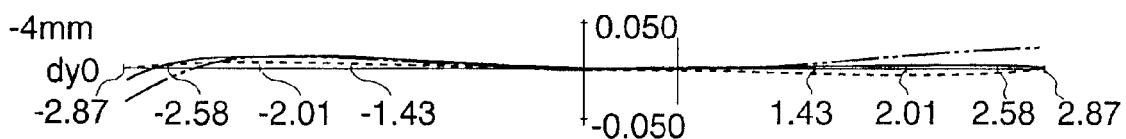
Figure 19C:
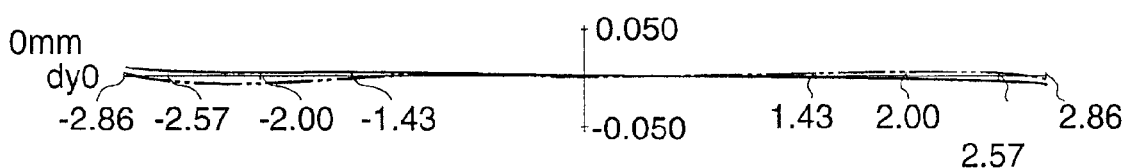
Figure 20A:
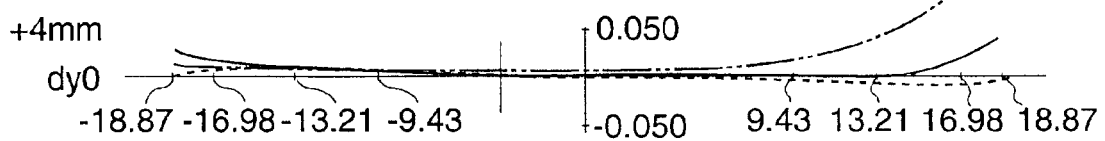
FIGS. 20A to 20C are aberration diagrams showing lateral aberrations at the focal length f of 69.79 mm in the zoom lens according to the numerical example 2 of the invention.
Figure 20B:
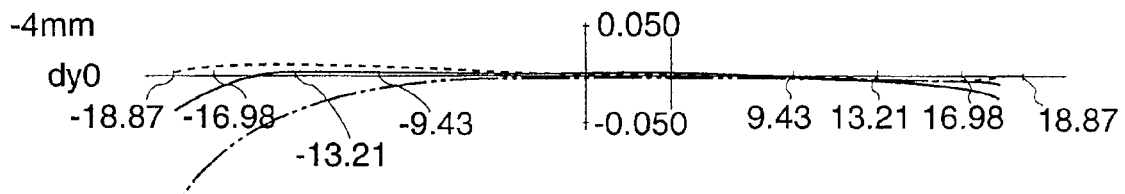
Figure 20C:
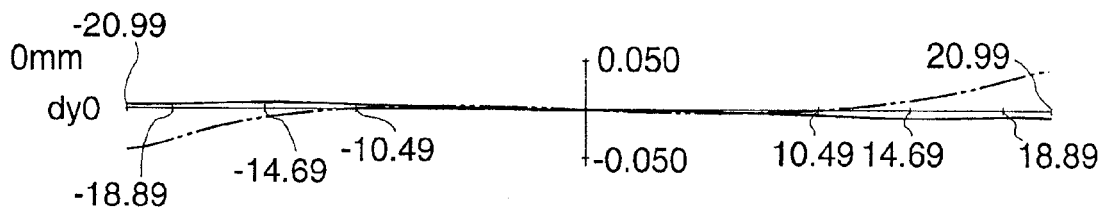
Figure 21A:
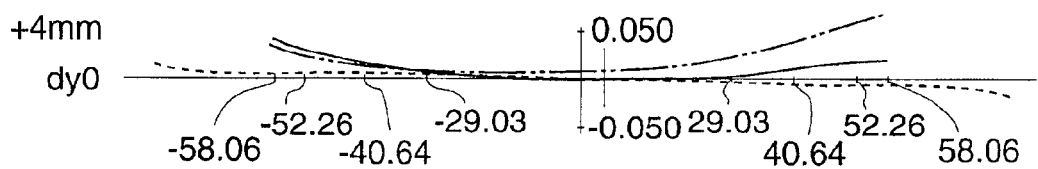
FIGS. 21A to 21C are aberration diagrams showing lateral aberrations at the focal length f of 257.37 mm in the zoom lens according to the numerical example 2 of the invention.
Figure 21B:
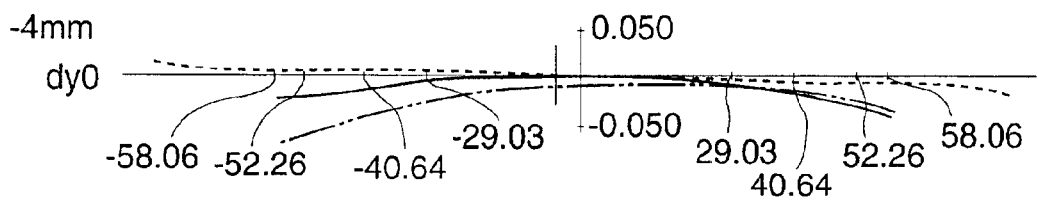
Figure 21C:
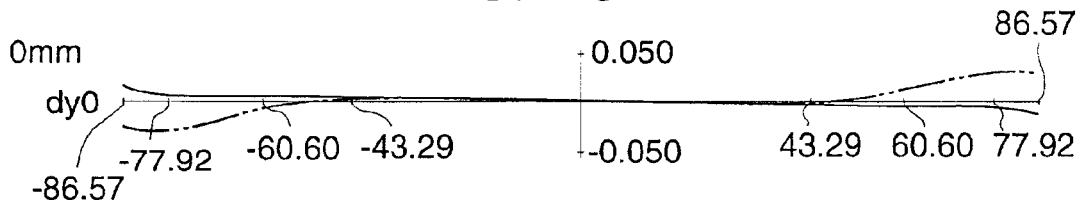
Figure 22A:
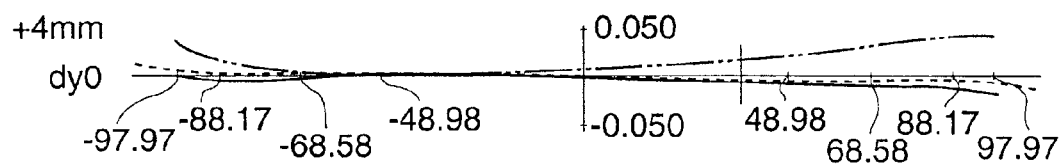
FIGS. 22A to 22C are aberration diagrams showing lateral aberrations at the telephoto end in the zoom lens according to the numerical example 2 of the invention.
Figure 22B:
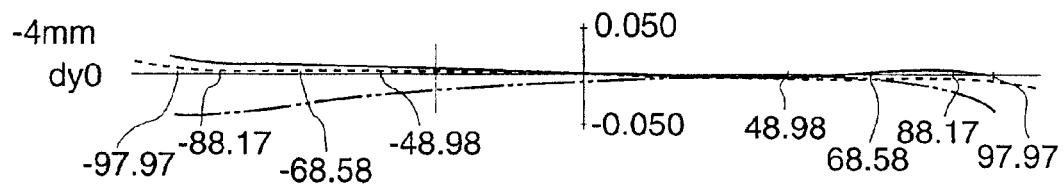
Figure 22C:
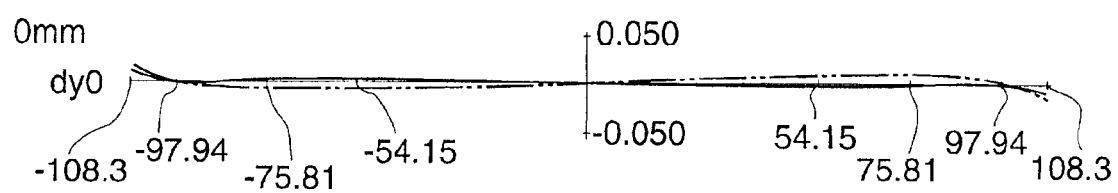
Figure 23A:
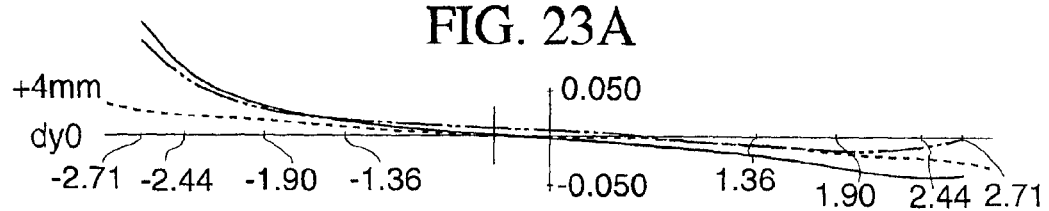
FIGS. 23A to 23C are aberration diagrams showing lateral aberrations when the image-stabilizing lens unit has shifted 1.8 mm at the wide-angle end in the zoom lens according to the numerical example 2 of the invention.
Figure 23B:
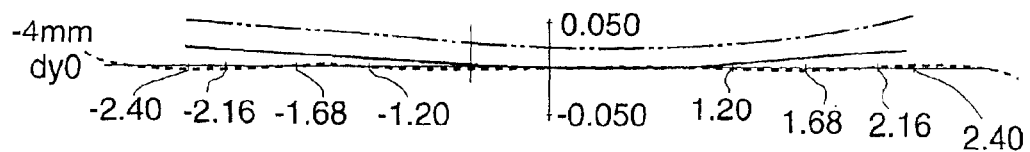
Figure 23C:
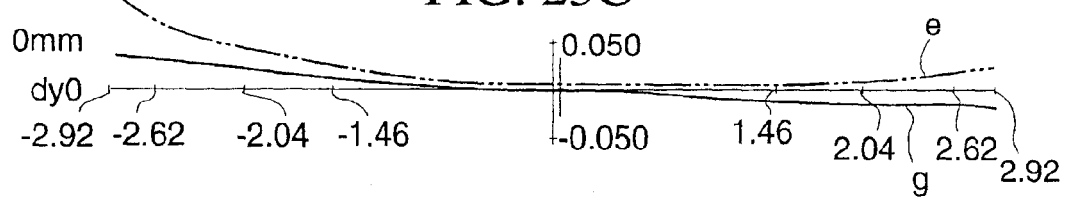
Figure 24A:
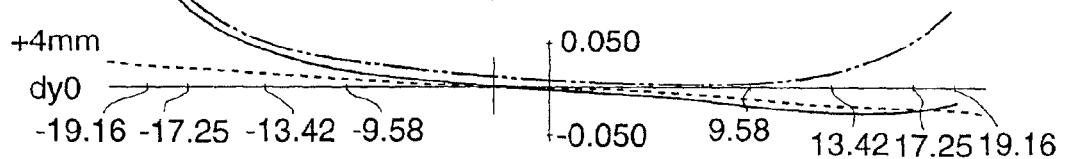
FIGS. 24A to 24C are aberration diagrams showing lateral aberrations when the image-stabilizing lens unit has shifted 1.8 mm at the focal length f of 69.79 mm in the zoom lens according to the numerical example 2 of the invention.
Figure 24B:
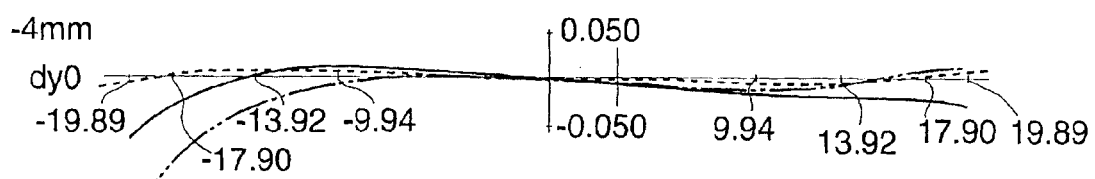
Figure 24C:
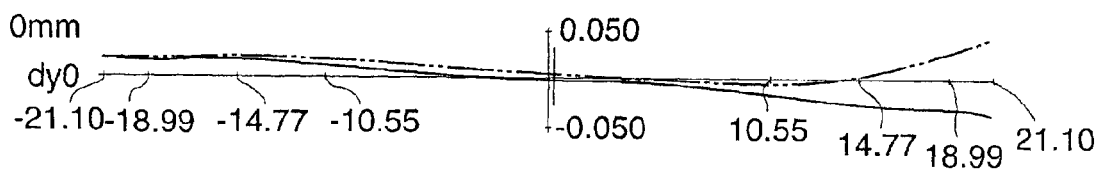
Figure 25A:
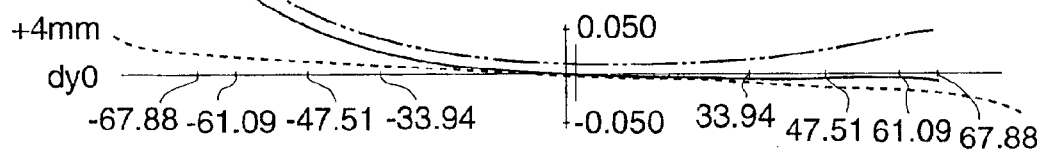
FIGS. 25A to 25C are aberration diagrams showing lateral aberrations when the image-stabilizing lens unit has shifted 1.8 mm at the focal length f of 257.37 mm in the zoom lens according to the numerical example 2 of the invention.
Figure 25B:
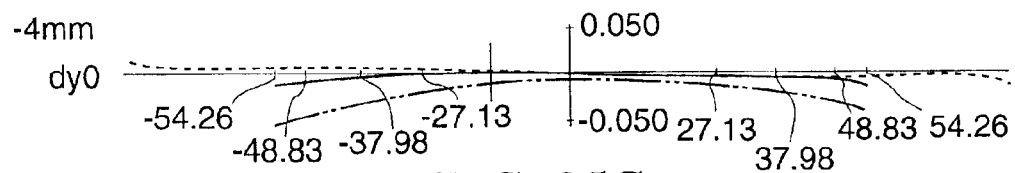
Figure 25C:
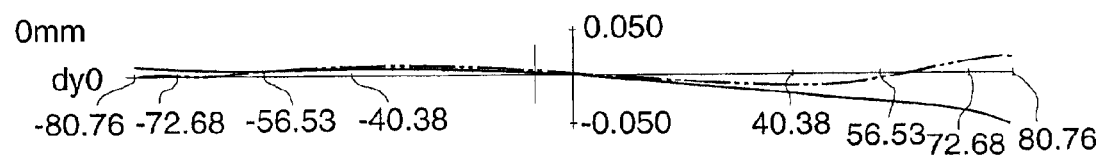
Figure 26A:
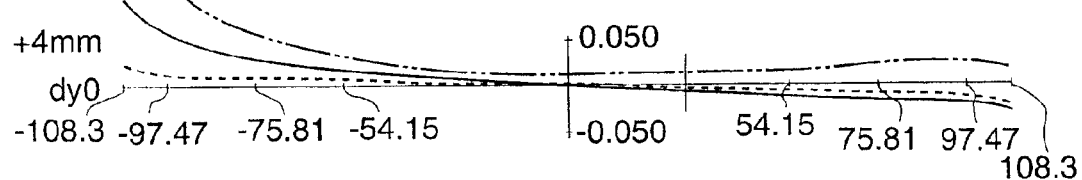
FIGS. 26A to 26C are aberration diagrams showing lateral aberrations when the image-stabilizing lens unit has shifted 1.8 mm at the telephoto end in the zoom lens according to the numerical example 2 of the invention.
Figure 26B:
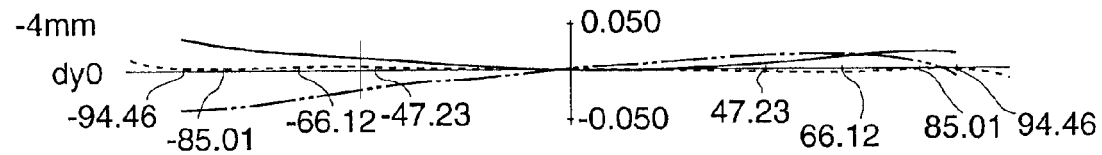
Figure 26C:
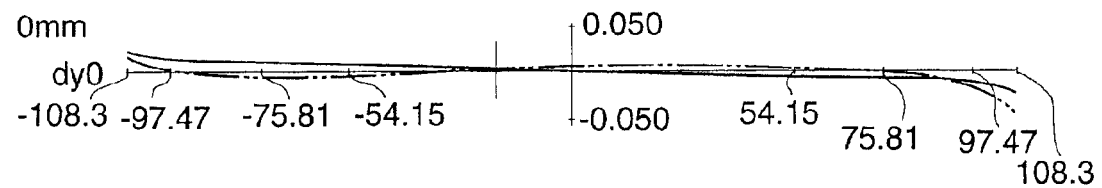

FIG. 14 is a sectional view showing the construction of a zoom lens at the wide-angle end according to a numerical example 2 of the invention. In FIG. 14, reference character F denotes a focusing lens unit (front lens unit), serving as a first lens unit, of positive refractive power.

Reference character V denotes a variator, serving as a second lens unit, of negative refractive power for the variation of magnification. The variation of magnification from the wide-angle end to the telephoto end is effected by moving the variator V monotonically toward the image side along the optical axis. Reference character C denotes a compensator, serving as a third lens unit, of positive refractive power, which is arranged to move nonlinearly toward the object side along the optical axis so as to compensate for the shift of an image plane caused by the variation of magnification. The variator V and the compensator C constitute a magnification varying system.

Reference character SP denotes a stop, and reference character R denotes a stationary relay lens unit, serving as a fourth lens unit, of positive refractive power as a whole. Reference character P denotes a color separation prism, an optical filter or the like, which is illustrated as a glass block in FIG. 14.

The fourth lens unit is composed of a lens subunit 4F of negative refractive power and a lens subunit 4R of positive refractive power. The whole lens subunit 4F serves as the image-stabilizing lens unit, having the function of moving in a direction perpendicular to the optical axis for the purpose of stabilizing an image. The image-stabilizing lens unit is composed of two negative lenses and one positive lens. When a converted inclination angle of incidence of a light flux on the image-stabilizing lens unit is denoted by $\alpha$, a converted inclination angle of exit of a light flux from the image-stabilizing lens unit is denoted by $\alpha'$, a mean value of Abbe numbers of material of the negative lenses of the image-stabilizing lens unit is denoted by vn(4F), and an Abbe number of material of the positive lens of the image-stabilizing lens unit is denoted by vp(4F), the above-mentioned conditions (1) and (2) are satisfied as shown by the following values:

$$\alpha' - \alpha = -0.848$$

$$vn(4F) - vp(4F) = 12.5$$

$$(vn(4F) = 40.8,$$

$$vp(4F) = 28.3)$$

Further, the lens subunit 4R is composed of five positive lenses and three negative lenses. When a mean value of Abbe numbers of material of the positive lenses of the lens subunit 4R is denoted by vp(4R), and a mean value of Abbe numbers of material of the negative lenses of the lens subunit 4R is denoted by vn(4R), the above-mentioned condition (3) is satisfied as shown by the following values:

$$vp(4R) - vn(4R) = 11.9$$

$$(vp(4R) = 53.3,$$

$$vn(4R) = 41.4)$$

Further, the various decentering aberration coefficients, factors, etc., corresponding to the above equations (c) to (h) and (1) are listed in Table-2 with the image-stabilizing lens unit denoted by p, and the lens unit disposed on the image side of the image-stabilizing lens unit denoted by q.

By appropriately setting the converted inclination angles of incidence and exit on and from the image-stabilizing lens unit, and the shared values of aberration coefficients of the image-stabilizing lens unit and the lens unit disposed on the image side of the image-stabilizing lens unit, it is possible to make the decentering aberration coefficients of the image-stabilizing lens unit very small.

TABLE 2

| | | | | | | |
|---|---|---|---|---|---|---|
| $\alpha_p$ | 1.0492 | $L_p$ | 0.0244 | $L_q$ | −0.0270 | TE | −0.0036 |
| $\alpha_p'$ | 0.2007 | $T_p$ | 0.0021 | $T_q$ | −0.0048 | IIE | −0.0237 |
| $\overline{\alpha}_p$ | −0.1917 | $I_p$ | −8.2768 | $I_q$ | 1.7561 | IIIE | 0.0014 |
| $\overline{\alpha}_p'$ | −0.2211 | $II_p$ | 1.8845 | $II_q$ | −0.4273 | PE | −0.0547 |
| | | $III_p$ | −0.1049 | $III_q$ | −0.3243 | VE1 | 0.0283 |
| | | $P_p$ | −0.0796 | $P_q$ | 0.1628 | VE2 | −0.0200 |
| | | $V_p$ | −0.0155 | $V_q$ | −0.0018 | ΔE | 1.6971 |

The rate of variation Z2 of lateral magnification of the second lens unit is 9.21, and the zoom ratio Z is 44.1, so that the above conditions (4) and (5) are satisfied.

FIGS. 15A to 15D through FIGS. 18A to 18D are aberration diagrams showing the various longitudinal aberrations at the wide-angle end, at the focal length f of 69.79 mm, at the focal length, f of 257.37 mm and at the telephoto end, respectively, in the zoom lens according to the numerical example 2.

FIGS. 19A to 19C through FIGS. 22A to 22C are aberration diagrams showing lateral aberrations, with the image height being 0 mm and ±4 mm, at the wide-angle end, at the focal length f of 69.79 mm, at the focal length f of 257.37 mm and at the telephoto end, respectively, in the zoom lens according to the numerical example 2.

FIGS. 23A to 23C through FIGS. 26A to 26C are aberration diagrams showing lateral aberrations, with the image height being 0 mm and +4 mm, when the image stabilizing lens unit has shifted at the wide-angle end, at the focal length f of 69.79 mm, at the focal length f of 257.37 mm and at the telephoto end, respectively, in the zoom lens according to the numerical example 2.

Incidentally, while, in the numerical example 2, the image-stabilizing lens unit is composed of the whole lens subunit 4F, this arrangement may be changed to such a construction that the lens subunit 4F, with the number of constituent lenses thereof increased, is divided into a plurality of lens units and a certain lens unit among the plurality of lens units is made to be the image-stabilizing lens unit.

As described above, in the numerical example 2, the refractive power arrangement of the entire lens system, the arrangement of the magnification varying lens units and the arrangement of the image-stabilizing lens unit in the fourth lens unit are appropriately set, and the lens construction of the image-stabilizing lens unit is also appropriately set. Accordingly, it is possible to obtain high optical performance over the entire range of variable magnification even during the image stabilizing operation.

Next, numerical data of the numerical examples 1 and 2 of the invention are shown. In the numerical data of the numerical examples 1 and 2, ri is the radius of curvature of the i-th lens surface, when counted from the object side, di is the i-th lens thickness or air separation, when counted from the object side, and ni and vi are respectively the refractive index and Abbe number of glass of the i-th lens element, when counted from the object side.

In the numerical examples 1 and 2, the last two lens surfaces constitute a glass block, such as a face plate or a filter.

NUMERICAL EXAMPLE 1

| f = 9.99978 | Fno = 1:1.8–3.3 | 2ω = 57.6°–1.4° | |
|---|---|---|---|
| r1 = 262.527 | d1 = 5.50 | n1 = 1.83932 | v1 = 37.2 |
| r2 = 148.600 | d2 = 0.20 | | |
| r3 = 146.720 | d3 = 19.47 | n2 = 1.43496 | v2 = 95.1 |
| r4 = 1711.919 | d4 = 11.35 | | |
| r5 = 446.535 | d5 = 12.04 | n3 = 1.43496 | v3 = 95.1 |
| r6 = −528.168 | d6 = 0.07 | | |
| r7 = −522.929 | d7 = 5.00 | n4 = 1.77621 | v4 = 49.6 |
| r8 = −7601.809 | d8 = 0.30 | | |
| r9 = 189.702 | d9 = 18.57 | n5 = 1.43496 | v5 = 95.1 |
| r10 = −890.210 | d10 = 0.30 | | |
| r11 = 150.001 | d11 = 11.18 | n6 = 1.49845 | v6 = 81.6 |
| r12 = 393.239 | d12 = Variable | | |
| r13 = 521.146 | d13 = 2.00 | n7 = 1.77621 | v7 = 49.6 |
| r14 = 53.105 | d14 = 4.73 | | |
| r15 = −148.563 | d15 = 1.80 | n8 = 1.77621 | v8 = 49.6 |
| r16 = 51.373 | d16 = 6.72 | | |
| r17 = −66.261 | d17 = 1.80 | n9 = 1.79025 | v9 = 50.0 |
| r18 = 47.388 | d18 = 7.80 | n10 = 1.93306 | v10 = 21.3 |
| r19 = −366.607 | d19 = Variable | | |
| r20 = 633.050 | d20 = 6.36 | n11 = 1.43985 | v11 = 95.0 |
| r21 = −113.045 | d21 = 0.30 | | |
| r22 = 201.150 | d22 = 2.50 | n12 = 1.65223 | v12 = 33.8 |
| r23 = 53.110 | d23 = 13.60 | n13 = 1.59143 | v13 = 61.2 |
| r24 = −155.230 | d24 = 0.20 | | |
| r25 = 131.701 | d25 = 13.00 | n14 = 1.62032 | v14 = 63.4 |
| r26 = −75.433 | d26 = 2.50 | n15 = 1.85501 | v15 = 23.9 |
| r27 = −155.034 | d27 = 0.20 | | |
| r28 = 95.626 | d28 = 4.25 | n16 = 1.48915 | v16 = 70.2 |
| r29 = 293.766 | d29 = Variable | | |
| r30 = (Stop) | d30 = 3.29 | | |
| r31 = −106.669 | d31 = 1.80 | n17 = 1.82017 | v17 = 46.6 |
| r32 = 47.175 | d32 = 0.18 | | |
| r33 = 38.336 | d33 = 3.81 | n18 = 1.85501 | v18 = 23.9 |
| r34 = 100.002 | d34 = 5.39 | | |
| r35 = −30.196 | d35 = 1.60 | n19 = 1.73234 | v19 = 54.7 |
| r36 = 26.193 | d36 = 17.64 | n20 = 1.57047 | v20 = 42.8 |
| r37 = −28.031 | d37 = 19.00 | | |
| r38 = −99.571 | d38 = 5.20 | n21 = 1.51977 | v21 = 52.4 |
| r39 = −27.773 | d39 = 0.20 | | |
| r40 = −36.155 | d40 = 2.20 | n22 = 1.79013 | v22 = 44.2 |
| r41 = 35.022 | d41 = 7.02 | n23 = 1.55099 | v23 = 45.8 |
| r42 = −61.501 | d42 = 1.10 | | |
| r43 = 78.384 | d43 = 7.60 | n24 = 1.48915 | v24 = 70.2 |
| r44 = −32.064 | d44 = 2.20 | n25 = 1.81265 | v25 = 25.4 |
| r45 = −69.443 | d45 = 0.20 | | |
| r46 = 73.620 | d46 = 4.59 | n26 = 1.50349 | v26 = 56.4 |
| r47 = −82.081 | d47 = 5.00 | | |
| r48 = ∞ | d48 = 50.00 | n27 = 1.51825 | v27 = 64.2 |
| r49 = ∞ | | | |

| | Focal Length | | | |
|---|---|---|---|---|
| Variable Separation | 10.00 | 69.79 | 257.36 | 441.09 |
| d12 | 2.37 | 92.37 | 115.87 | 121.38 |
| d19 | 176.20 | 67.02 | 19.71 | 0.14 |
| d29 | 3.30 | 22.48 | 46.29 | 60.36 |

NUMERICAL EXAMPLE 2

| f = 10.00000 | Fno = 1:1.8–3.1 | 2ω = 57.6°–1.4° | |
|---|---|---|---|
| r1 = 262.527 | d1 = 5.50 | n1 = 1.83932 | v1 = 37.2 |
| r2 = 148.600 | d2 = 0.20 | | |
| r3 = 146.720 | d3 = 19.47 | n2 = 1.43496 | v2 = 95.1 |
| r4 = 1711.919 | d4 = 11.35 | | |
| r5 = 446.535 | d5 = 12.04 | n3 = 1.43496 | v3 = 95.1 |
| r6 = −528.168 | d6 = 0.07 | | |
| r7 = −522.929 | d7 = 5.00 | n4 = 1.77621 | v4 = 49.6 |
| r8 = −7601.809 | d8 = 0.30 | | |
| r9 = 189.702 | d9 = 18.57 | n5 = 1.43496 | v5 = 95.1 |
| r10 = −890.210 | d10 = 0.30 | | |
| r11 = 150.001 | d11 = 11.18 | n6 = 1.49845 | v6 = 81.6 |
| r12 = 393.239 | d12 = Variable | | |
| r13 = 521.146 | d13 = 2.00 | n7 = 1.77621 | v7 = 49.6 |
| r14 = 53.105 | d14 = 4.73 | | |

-continued

| f = 10.00000 | Fno = 1:1.8–3.1 | 2ω = 57.6°–1.4° | |
|---|---|---|---|
| r15 = −148.563 | d15 = 1.80 | n8 = 1.77621 | v8 = 49.6 |
| r16 = 51.373 | d16 = 6.72 | | |
| r17 = −66.261 | d17 = 1.80 | n9 = 1.79025 | v9 = 50.0 |
| r18 = 47.388 | d18 = 7.80 | n10 = 1.93306 | v10 = 21.3 |
| r19 = −366.607 | d19 = Variable | | |
| r20 = 633.050 | d20 = 6.36 | n11 = 1.43985 | v11 = 95.0 |
| r21 = −113.045 | d21 = 0.30 | | |
| r22 = 201.150 | d22 = 2.50 | n12 = 1.65223 | v12 = 33.8 |
| r23 = 53.110 | d23 = 13.60 | n13 = 1.59143 | v13 = 61.2 |
| r24 = −155.230 | d24 = 0.20 | | |
| r25 = 131.701 | d25 = 13.00 | n14 = 1.62032 | v14 = 63.4 |
| r26 = −75.433 | d26 = 2.50 | n15 = 1.85501 | v15 = 23.9 |
| r27 = −155.034 | d27 = 0.20 | | |
| r28 = 95.626 | d28 = 4.25 | n16 = 1.48915 | v16 = 70.2 |
| r29 = 293.766 | d29 = Variable | | |
| r30 = (Stop) | d30 = 3.29 | | |
| r31 = −98.009 | d31 = 1.80 | n17 = 1.88814 | v17 = 40.8 |
| r32 = 42.998 | d32 = 0.20 | | |
| r33 = 30.611 | d33 = 9.58 | n18 = 1.74618 | v18 = 28.3 |
| r34 = −32.609 | d34 = 1.80 | n19 = 1.88814 | v19 = 40.8 |
| r35 = 96.858 | d35 = 7.48 | | |
| r36 = −42.629 | d36 = 1.60 | n20 = 1.73234 | v20 = 54.7 |
| r37 = 27.958 | d37 = 15.00 | n21 = 1.57047 | v21 = 42.8 |
| r38 = −33.727 | d38 = 19.00 | | |
| r39 = −166.259 | d39 = 4.99 | n22 = 1.48915 | v22 = 70.2 |
| r40 = −28.835 | d40 = 0.20 | | |
| r41 = −36.826 | d41 = 2.20 | n23 = 1.79013 | v23 = 44.2 |
| r42 = 63.095 | d42 = 6.18 | n24 = 1.50349 | v24 = 56.4 |
| r43 = −47.677 | d43 = 1.10 | | |
| r44 = 81.999 | d44 = 8.25 | n25 = 1.55099 | v25 = 45.8 |
| r45 = −29.154 | d45 = 2.20 | n26 = 1.81265 | v26 = 25.4 |
| r46 = −92.720 | d46 = 0.20 | | |
| r47 = 73.620 | d47 = 5.00 | n27 = 1.51977 | v27 = 52.4 |
| r48 = −82.081 | d48 = 5.00 | | |
| r49 = ∞ | d49 = 50.00 | n28 = 1.51825 | v28 = 64.2 |
| r50 = ∞ | | | |

| Variable | Focal Length | | | | |
|---|---|---|---|---|---|
| Separation | 10.00 | 19.49 | 69.79 | 257.37 | 441.10 |
| d12 | 2.37 | 44.37 | 92.37 | 115.87 | 121.38 |
| d19 | 176.20 | 129.14 | 67.02 | 19.71 | 0.14 |
| d29 | 3.30 | 8.36 | 22.48 | 46.29 | 60.36 |

Figure 28:
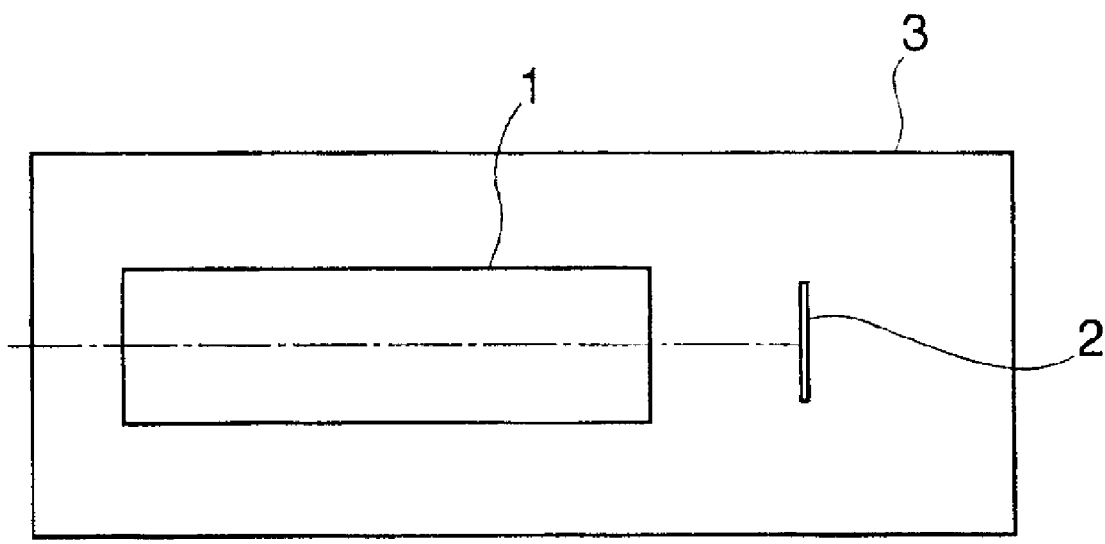
FIG. 28 is a conceptual diagram showing the construction of a photographing apparatus having an image-stabilizing zoom lens according to a further embodiment of the invention.

Next, a photographing apparatus having a zoom lens including the image-stabilizing lens unit as described above, according to another embodiment of the invention, will be described with reference to FIG. 28, which is a schematic diagram showing the photographing apparatus. In FIG. 28, reference numeral 1 denotes a photographing optical system using a zoom lens according to the embodiment of the invention, reference numeral 2 denotes a photoelectric conversion means such as a CCD, and reference numeral 3 denotes a photographing apparatus body (casing). By applying the zoom lens having the image-stabilizing lens unit according to the embodiment of the invention to the photographing optical system of the photographing apparatus, as described in the foregoing, it is possible to realize a photographing apparatus which is compact and has high optical performance even during the image stabilizing operation.

As described above, according to the invention, it is possible to attain a zoom lens having an image stabilizing function suited for the so-called four-unit zoom lens, in which the shaking of a photographed image is corrected by driving a lens unit that is a part of the zoom lens to decenter in a direction perpendicular to the optical axis, and each lens element of the zoom lens is appropriately set to reduce the size of the image-stabilizing lens unit and to correct well the various aberrations and decentering aberration.

In addition, according to the invention, in the so-called four-unit zoom lens, the refractive power arrangement of the entire lens system, the arrangement of the magnification varying lens units and the arrangement of the fourth lens unit are appropriately set. Accordingly, it is possible to attain a zoom lens having an image stabilizing function with the whole mechanism therefor reduced in size and weight and having high optical performance over the entire range of variable magnification even during the image stabilizing operation.

What is claimed is:

1. A zoom lens comprising, in order from an object side to an image side:

a first lens unit of positive refractive power;

a second lens unit of negative refractive power arranged to move during variation of magnification;

a third lens unit arranged to compensate for shift of an image plane due to the variation of magnification; and a fourth lens unit of positive refractive power, wherein said fourth lens unit has a first lens subunit of negative refractive power, and an image is displaced by moving said first lens subunit in such a way that said first lens subunit has a component of motion in a direction perpendicular to an optical axis of said zoom lens, and wherein said fourth lens unit is stationary during variation of magnification.

2. A zoom lens according to claim 1, wherein said first lens subunit consists of one positive lens and one negative lens.

3. A zoom lens according to claim 1, wherein said first lens subunit consists of one positive lens and two negative lenses.

4. A zoom lens according to claim 1, wherein said fourth lens unit further has a second lens subunit of positive refractive power on the image side of said first lens subunit.

5. A zoom lens according to claim 4, wherein said third lens unit is of positive refractive power, and said fourth lens unit consists of, in order from the object side to the image side, said first lens subunit of negative refractive power and said second lens subunit of positive refractive power.

6. A zoom lens according to claim 4, wherein the following condition is satisfied:

$$\alpha'-\alpha<-0.45$$

where $\alpha$ is a converted inclination angle of incidence on a lens surface on the most object side of said first lens subunit, and $\alpha'$ is a converted inclination angle of exit from a lens surface on the most image side of said first lens subunit.

7. A zoom lens according to claim 4, wherein the following condition is satisfied:

$$vn(4F)-vp(4F)>10$$

where vn(4F) is, when said first lens subunit includes only one negative lens, an Abbe number of material of the negative lens included in said first lens subunit or, when said first lens subunit includes a plurality of negative lenses, a mean value of Abbe numbers of material of all the negative lenses included in said first lens subunit, and vp(4F) is, when said first lens subunit includes only one positive lens, an Abbe number of material of the positive lens included in said first lens subunit or, when said first lens subunit includes a plurality of positive lenses, a mean value of Abbe numbers of material of all the positive lenses included in said first lens subunit.

8. A zoom lens according to claim 4, wherein the following condition is satisfied:

$$vp(4R)-vn(4R)>10$$

where vp(4R) is, when said second lens subunit includes only one positive lens, an Abbe number of material of the positive lens included in said second lens subunit or, when said second lens subunit includes a plurality of positive lenses, a mean value of Abbe numbers of material of all the positive lenses included in said second lens subunit, and vn(4R) is, when said second lens subunit includes only one negative lens, an Abbe number of material of the negative lens included in said second lens subunit or, when said second lens subunit includes a plurality of negative lenses, a mean value of Abbe numbers of material of all the negative lenses included in said second lens subunit.

9. A zoom lens according to claim 1, wherein an image forming magnification of said second lens unit varies within a range including −1× during the variation of magnification, an image forming magnification of said third lens unit varies within a range including −1× during the variation of magnification, and the following conditions are satisfied:

$$5<Z2$$

$$0.15<Z2/Z$$

where Z2 is a ratio of magnification of said second lens unit at the telephoto end to the magnification of said second lens unit at the wide-angle end, and Z is a zoom ratio of said zoom lens.

10. A zoom lens according to claim 1, wherein an extender conversion optical system for is insertably and detachably disposed in a position on the image side of said first lens subunit, the insertion of said extender optical system varying the focal length of said zoom lens.

11. A photographing apparatus comprising:

a zoom lens according to claim 1; and a casing holding said zoom lens.

12. A zoom lens comprising, in order from an object side to an image side:

a first lens unit comprising a plurality of lenses, said first lens unit being arranged to move during variation of magnification; and a second lens unit of positive refractive power, wherein said second lens unit comprises an image-stabilizing means, and an image is displaced by moving said image-stabilizing means, wherein said second lens unit is stationary during variation of magnification, wherein said image-stabilizing means comprises at least one positive lens and at least one negative lens, and wherein the following condition is satisfied:

$$vn(4F)-vp(4F)>10$$

where vn(4F) is, when said image stabilizing means includes only one negative lens, an Abbe number of material of the negative lens in said image stabilizing means or, when said image stabilizing means includes a plurality of negative lenses, a mean value of Abbe numbers of material of all the negative lenses included in said image stabilizing means, and vp(4F) is, when said image stabilizing means includes only one positive lens, an Abbe number of material of the positive lens in said image stabilizing means or, when said image stabilizing means includes a plurality of positive lenses, a mean value of Abbe numbers of material of all the positive lenses included in said image stabilizing means.

13. A zoom lens comprising, in order from an object side to an image side:

a first lens unit comprising a plurality of lenses, said first lens unit being arranged to move during variation of magnification; and a second lens unit, wherein said second lens unit comprises an image-stabilizing means, and an image is displaced by moving said image-stabilizing means so as to have a component of motion in a direction perpendicular to an optical axis of said zoom lens, and wherein an extender optical system is insertably and detachably disposed in a position on the image side of said image-stabilizing means, the insertion of said extender optical system varying the focal length of said zoom lens.

14. A zoom lens according to claim 13, wherein said second lens unit includes said extender optical system, and wherein said second lens unit is stationary during variation of magnification.

15. A zoom lens comprising:

an extender optical system; and an image-stabilizing means, wherein an image is displaced by moving said image-stabilizing means so as to have a component of motion in a direction perpendicular to an optical axis of said zoom lens, wherein said extender optical system is insertably and detachably disposed in a position on the image side of said image-stabilizing means, the insertion of said extender optical system varying the focal length of said zoom lens, and wherein a lens element of said zoom lens that is arranged to move during variation of magnification is disposed on the object side of said image-stabilizing means.

16. A zoom lens according to any one of claims 12 or 13 through 15, wherein said image-stabilizing means is an image-stabilizing lens subunit.

17. A photographing apparatus comprising:

a zoom lens according to claim 16; and a casing holding said zoom lens.

18. A zoom lens according to claim 12, wherein said second lens unit further comprises a stationary lens element on the image side of said image-stabilizing means.

19. A zoom lens according to claim 12, wherein the image is displaced by moving said image stabilizing means in such a way that said image stabilizing means has a component of motion in a direction perpendicular to an optical axis of said zoom lens.

* * * * *

UNITED STATES PATENT AND TRADEMARK OFFICE
CERTIFICATE OF CORRECTION

PATENT NO. : 6,989,942 B1  Page 1 of 1
APPLICATION NO. : 09/669664
DATED : January 24, 2006
INVENTOR(S) : Ryuji Nurishi It is certified that error appears in the above-identified patent and that said Letters Patent is hereby corrected as shown below:

COLUMN 11
Line 2, "Further" should begin a new paragraph.

COLUMN 15
Line 27, "and+4" should read --and ±4--.

COLUMN 19
Line 32, "system for is" should read --system is--.

Signed and Sealed this

Twenty-second Day of August, 2006

JON W. DUDAS
*Director of the United States Patent and Trademark Office*